Nov. 23, 1937.  H. C. ROBINSON  2,099,754
CALCULATING MACHINE
Filed March 25, 1932  9 Sheets-Sheet 7
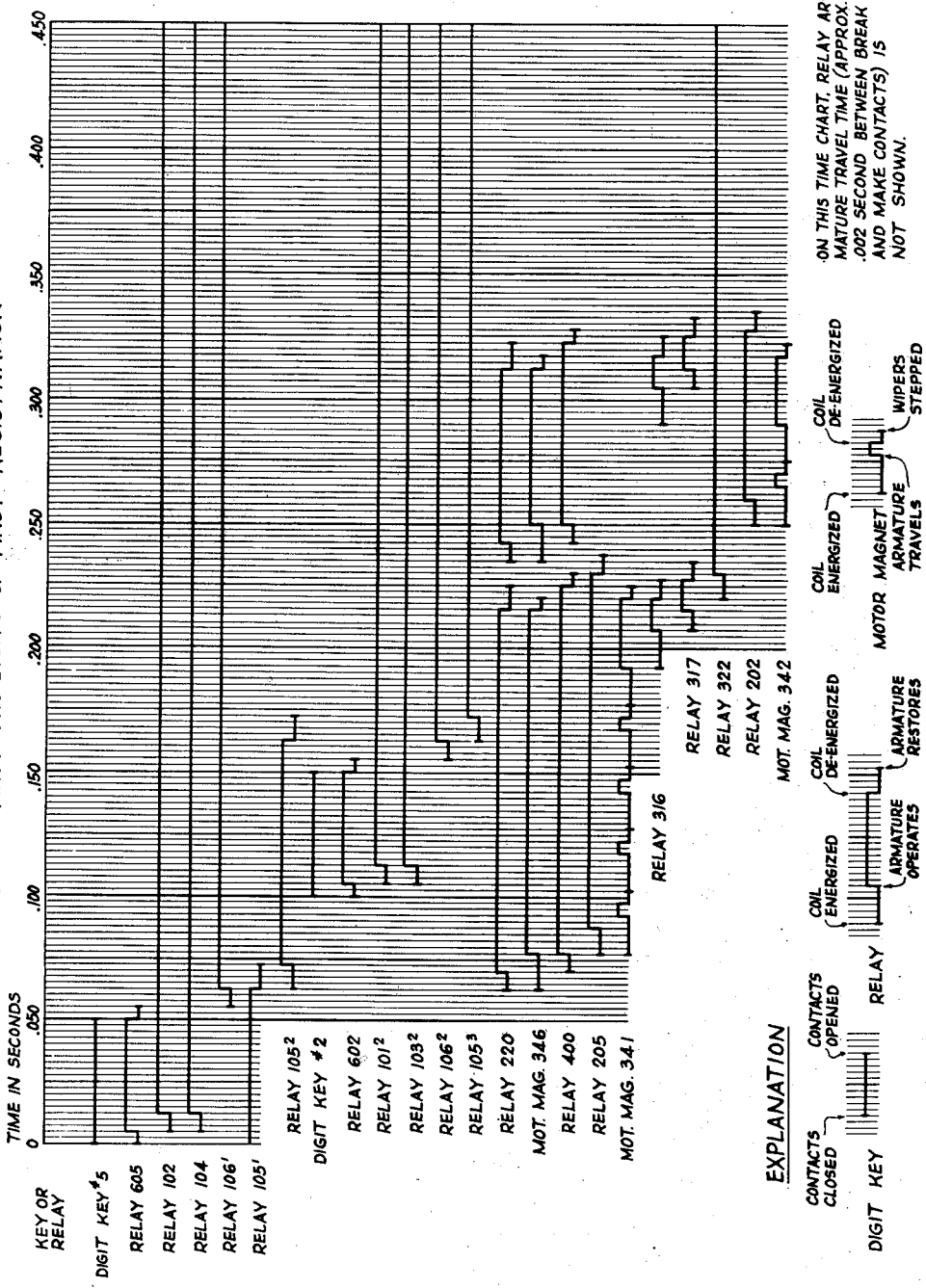
INVENTOR.
HAROLD C. ROBINSON
BY
ATTORNEY.

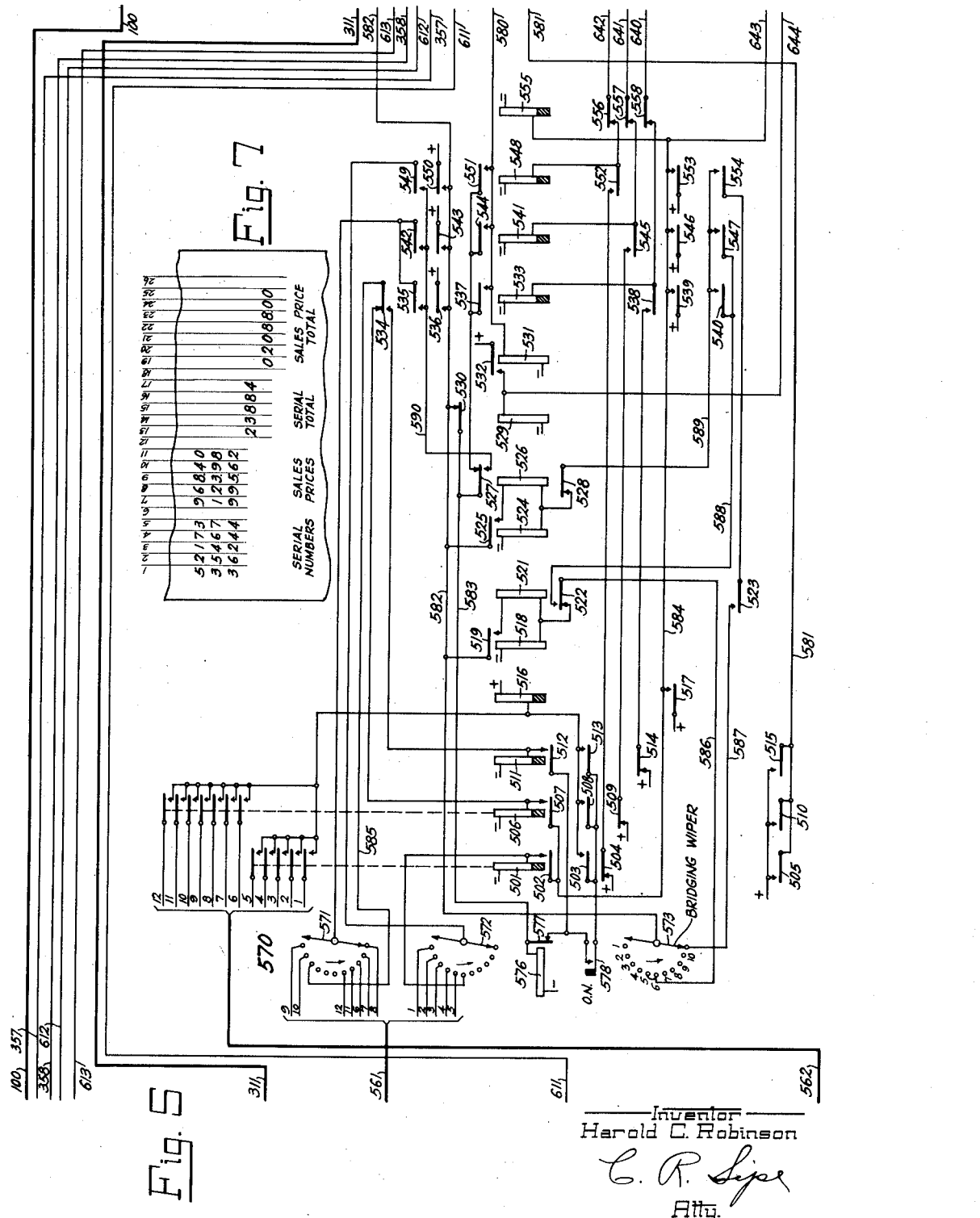

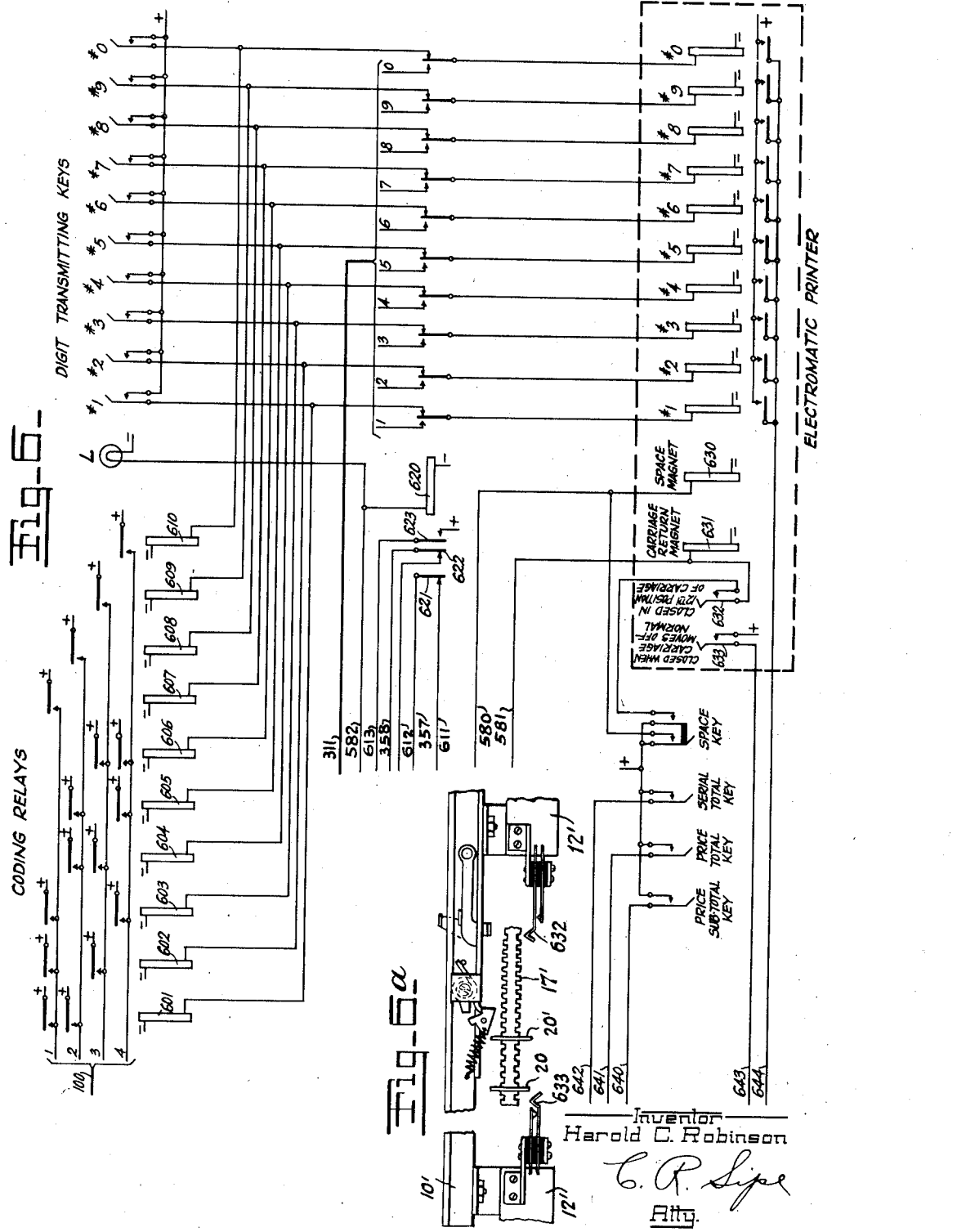

Nov. 23, 1937.  H. C. ROBINSON  2,099,754
CALCULATING MACHINE
Filed March 25, 1932  9 Sheets-Sheet 8
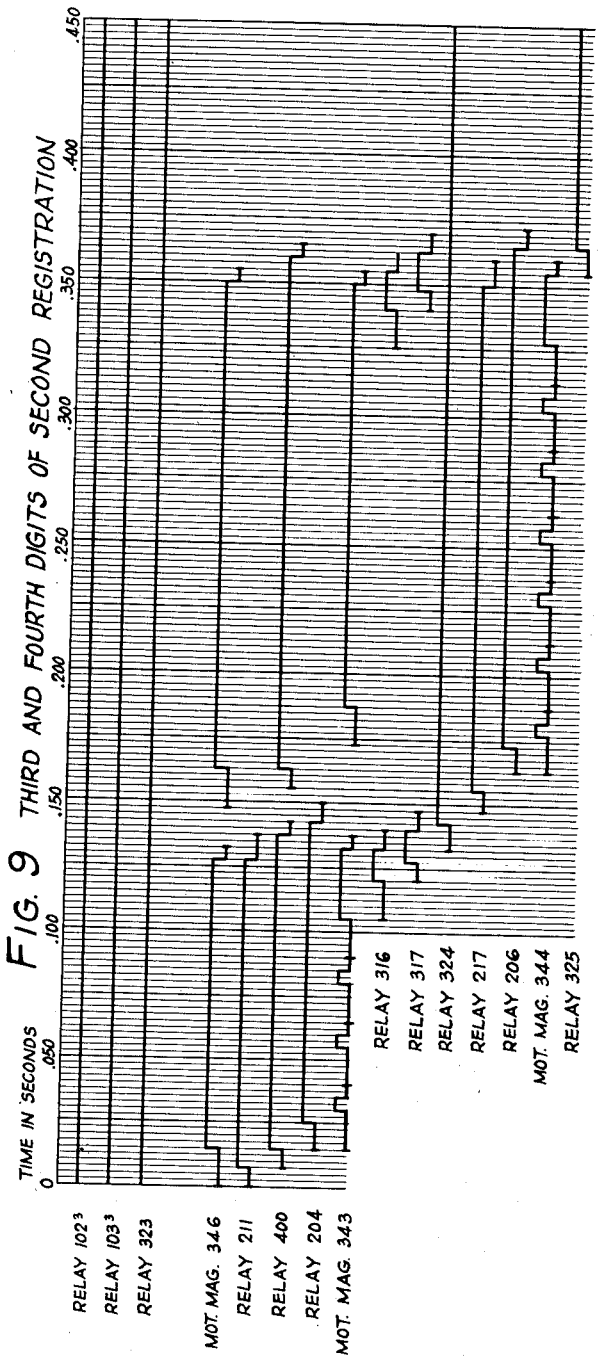
FIG. 9  THIRD AND FOURTH DIGITS OF SECOND REGISTRATION
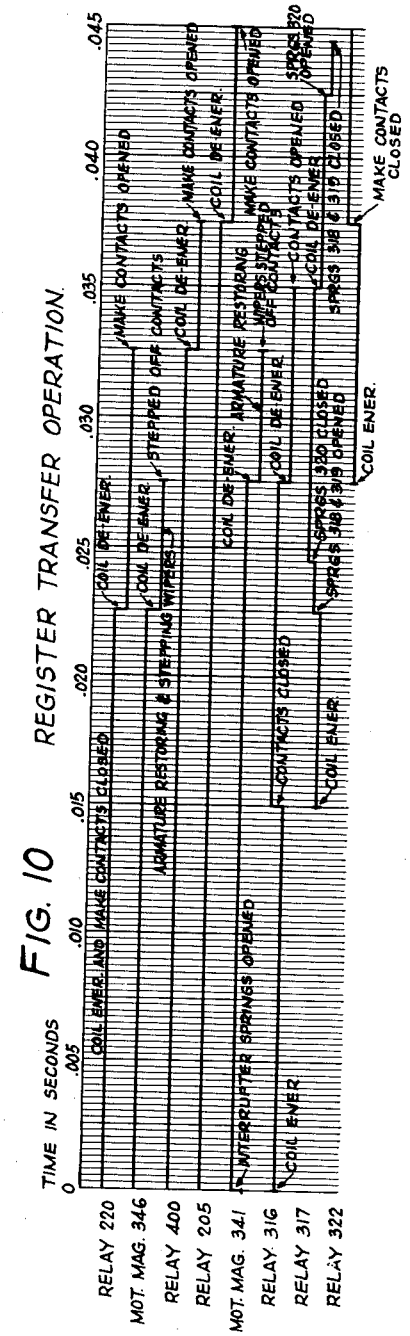
FIG. 10  REGISTER TRANSFER OPERATION.
INVENTOR.
HAROLD C. ROBINSON.
BY
ATTORNEY.

Nov. 23, 1937.  H. C. ROBINSON  2,099,754
CALCULATING MACHINE
Filed March 25, 1932   9 Sheets-Sheet 9

SERIAL NUMBER TOTAL

INVENTOR.
HAROLD C. ROBINSON
BY
ATTORNEY.

Patented Nov. 23, 1937

2,099,754

UNITED STATES PATENT OFFICE 2,099,754

CALCULATING MACHINE

Harold C. Robinson, Chicago, Ill., assignor, by mesne assignments, to Associated Electric Laboratories, Inc., Chicago, Ill., a corporation of Delaware Application March 25, 1932, Serial No. 601,141

17 Claims. (Cl. 235—58)

This invention relates to calculating machines in general, but it relates more particularly to electrically controlled and operated calculating machines. The principal object of this invention, briefly stated, is the provision of an electric calculating machine which responds to successive series of impulses representing the digits of multidigit numbers to perform mathematical calculations and to register the results of such calculations.

One feature of the present invention is embodied in the use of rotary step-by-step switches as digit registers.

Another feature is embodied in the arrangement whereby the coded impulses are deciphered and stored in order to permit impulse transmission more rapid than the calculations can be performed by the calculating apparatus itself.

Another feature is found in the arrangement whereby series of computations of corresponding orders of digits are performed in rapid succession to secure the result when multi-digit numbers are involved.

Still another feature is present in the arrangement by means of which the carry-over units, resulting from the individual computations of the series are registered.

Still other features are included in the arrangement whereby a printing device is electrically controlled at will to record the results of the computations which are registered in the register switches.

These and other features, not specifically mentioned at this time, may be completely understood by a study of the detailed description, which follows, in conjunction with the associated drawings.

Drawings

The associated drawings, comprising Figs. 1 to 7, which, when arranged with Fig. 1 at the left, Figs. 2 and 3 immediately to the right of Fig. 1 with Fig. 2 above Fig. 3, and with Figs. 4, 5, and 6 arranged to the right of Fig. 3 in the order named, diagrammatically depict, by means of the usual symbols, the computing machine of this invention. Figures 8 to 11, inclusive, are timing charts showing the relative time in seconds of the operations of the relays indicated therein.

Fig. 1 shows a plurality of decoding relay groups, which correspond in number to the maximum number of digits in the numbers to be added by the machine and which are allotted one to each digit. Each decoding relay group comprises four relays which receive a coded impulse and which, by means of contacts arranged in pyramidal formation, decipher the code and thereby cause an impulse to be transmitted through certain contacts to the conductor corresponding to the deciphered code. Associated with each decoding relay group is a pair of relays 105 and 106 which respond to the storing of a coded impulse in the associated decoding group to cause the next coded impulse received to be stored in the succeeding decoding relay group.

Fig. 2 shows the computing relays by means of which simple additions of the corresponding, deciphered digits of two successively transmitted groups of digits are made.

Fig. 3 shows a register comprising a plurality of register switches 301, 302, 303, 304, and 305, which have for their purpose the registering of the totals computed by the computing relays of Fig. 2. Each of these register switches comprises a rotary step-by-step switch which may be of any well-known type having wipers which are moved in a forward direction only upon the deenergization of the motor magnet. A switch of this type is disclosed in Sengebusch Patent No. 1,675,311, issued June 26, 1928. This register is arranged to register five-digit numbers or totals in which it is not necessary to carry over to the sixth order of digits any tens unit resulting from the adding of the fifth order of digits of two numbers in which the total is equal to or greater than ten.

At the left-hand side of Fig. 3, there is shown a sequence switch similar in mechanical construction to the register switches 301, etc., but having its circuit modified to perform the function of rendering the proper register switch effective at the proper time.

Fig. 4 shows a second register comprising a series of register switches, 406 to 412, inclusive, for registering the additions of five-digit numbers. This register provides for carrying over, into the sixth and seventh order of digits, units which might result from the addition of a number having a maximum of five digits to the total secured by previously adding together several numbers having a maximum of five digits. These register switches are similar in construction and in circuit design to the register switches in Fig. 3.

Fig. 5 shows the equipment by means of which it is possible to transfer the totals registered on the registers of Figs. 3 and 4 to a printing recorder.

Fig. 6 shows the number- or digit-transmitting keys and the coding relays operated thereby, by means of which coded impulses corresponding to the various digit keys operated are transmitted to the storing and decoding relay groups in Fig. 1. In the lower portion of this figure, there is shown a group of magnets enclosed in a rectangle and entitled "Electromatic Printer". The electromagnets #1—#0 are arranged to actuate the #1—#0 keys of a typewriter commercially known as the "Electromatic". Such a typewriter is shown and described in a booklet, having the title "The Story of Electromatic", distributed by Electromatic, Inc., of Rochester, New York, and also shown and described on pages 513 to 516, inclusive, of the November, 1930, issue of the publication known as "Product Engineering". In the well-known manner, operation of one of these magnets operates the associated key of the typewriter, causing it to function the same as if the key had been manually operated. In other words, the operation of any one of the magnets #1—#0 is the equivalent to the operation of a key on this type of typewriter. Further, since the contacts of the transmitter keys close circuits of these magnets, directly, through break contacts of a change-over relay 620, the typewriter operates to print any digits corresponding to the transmitting keys actuated in the same manner as if operated by its keys directly. The magnets #1—#0, however, are employed so that the typewriter can be controlled over the front contacts of relay 620, to print totals of groups of numbers previously printed and the sums of which have been set up on the various registers. Throughout the remainder of the specification the typewriter is designated as a printer as it is employed in the present disclosure as the printer portion of a calculating machine.

To the left of the printer in Fig. 6 there are shown four keys. It is by means of the three left-hand keys that the equipment of Fig. 5 is controlled to have either the total registered on the equipment of Fig. 3 or the total registered on the equipment of Fig. 4 printed by the electromatic printer. By means of the fourth key, "space key", the magnet 630 functions to shift the printer carriage without any printing taking place. It is to be understood that the digit-transmitting keys, the three total keys, and the space key, although separated in Fig. 6, are grouped together in a convenient arrangement at an operator's position.

Fig. 6a is a rear view of the printer and shows the manner in which the springs 632 and 633 of Fig. 6 are controlled by the tabular stops 20 and 20' of the electromatic printer.

Fig. 7 shows a section of the record sheet on which have been recorded the operations of the electromatic printer.

Figure 8 is a timing chart showing the timed relations of the operations of the various relays in registering the first two digits of the first registration.

Figure 9 is a similar timing chart showing the timing of the relay operations in registering the 3rd and 4th digits of a second registration of a serial number after one registration has been previously made.

Figure 1:
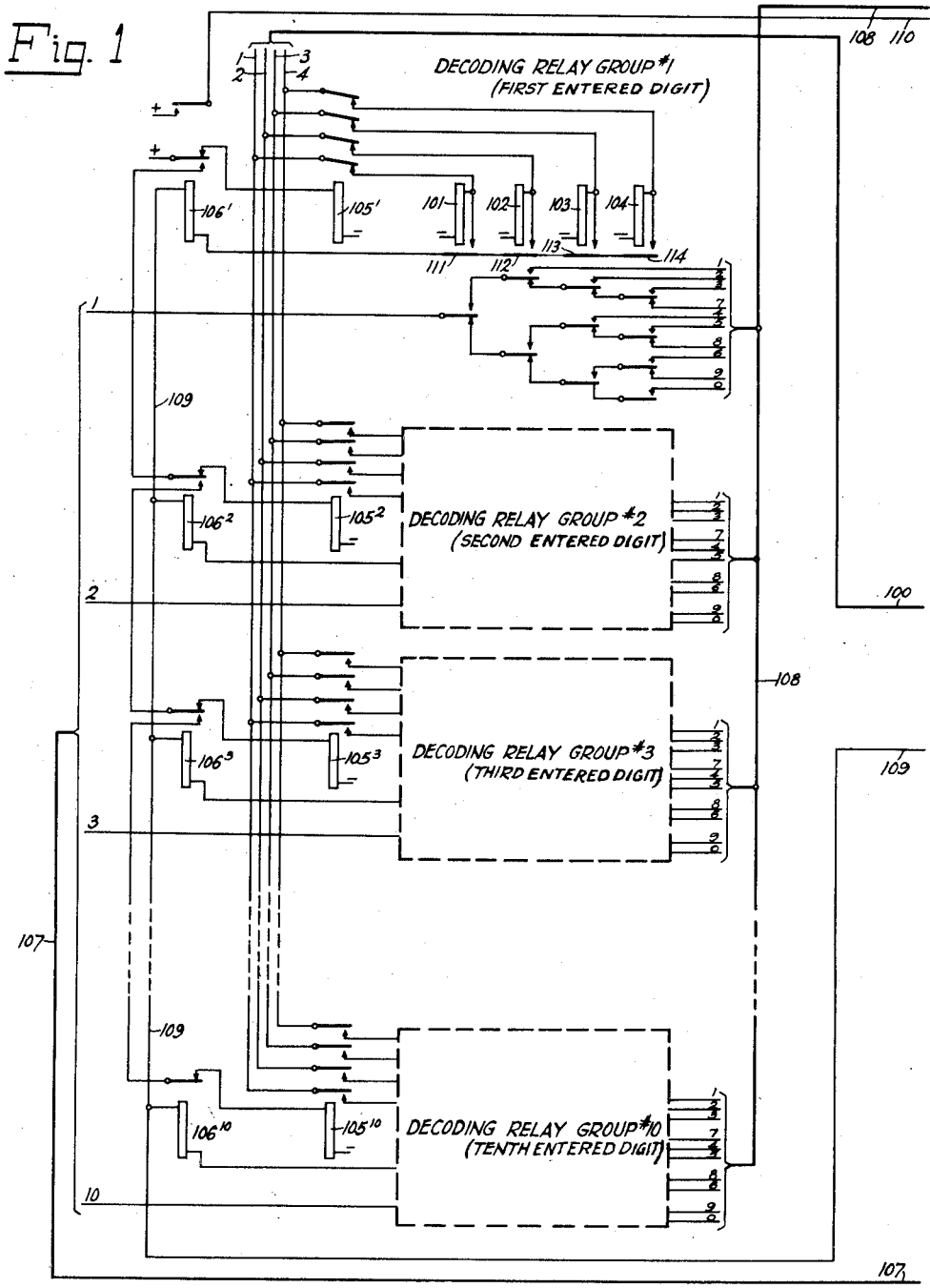
Figure 2:
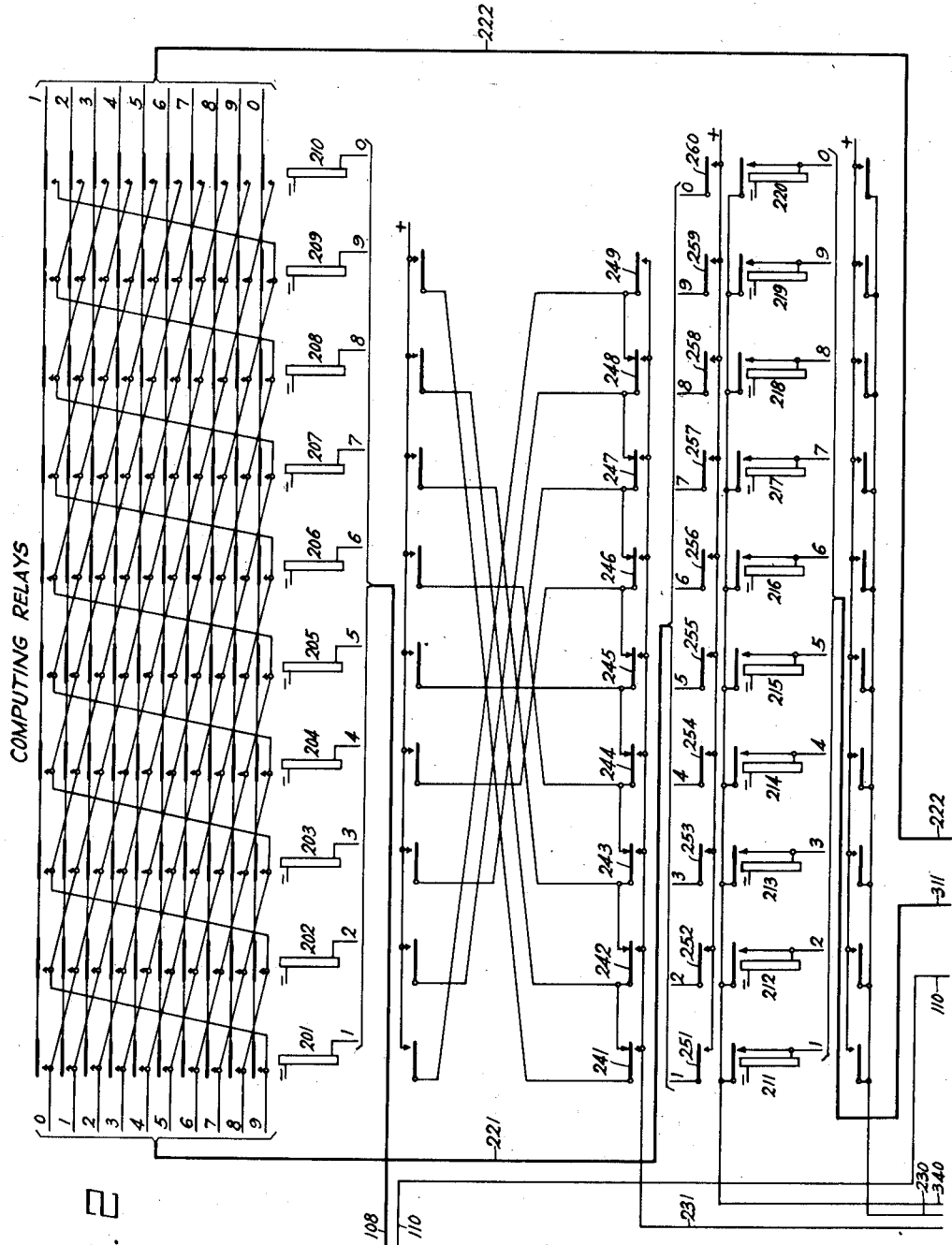
Figure 3:
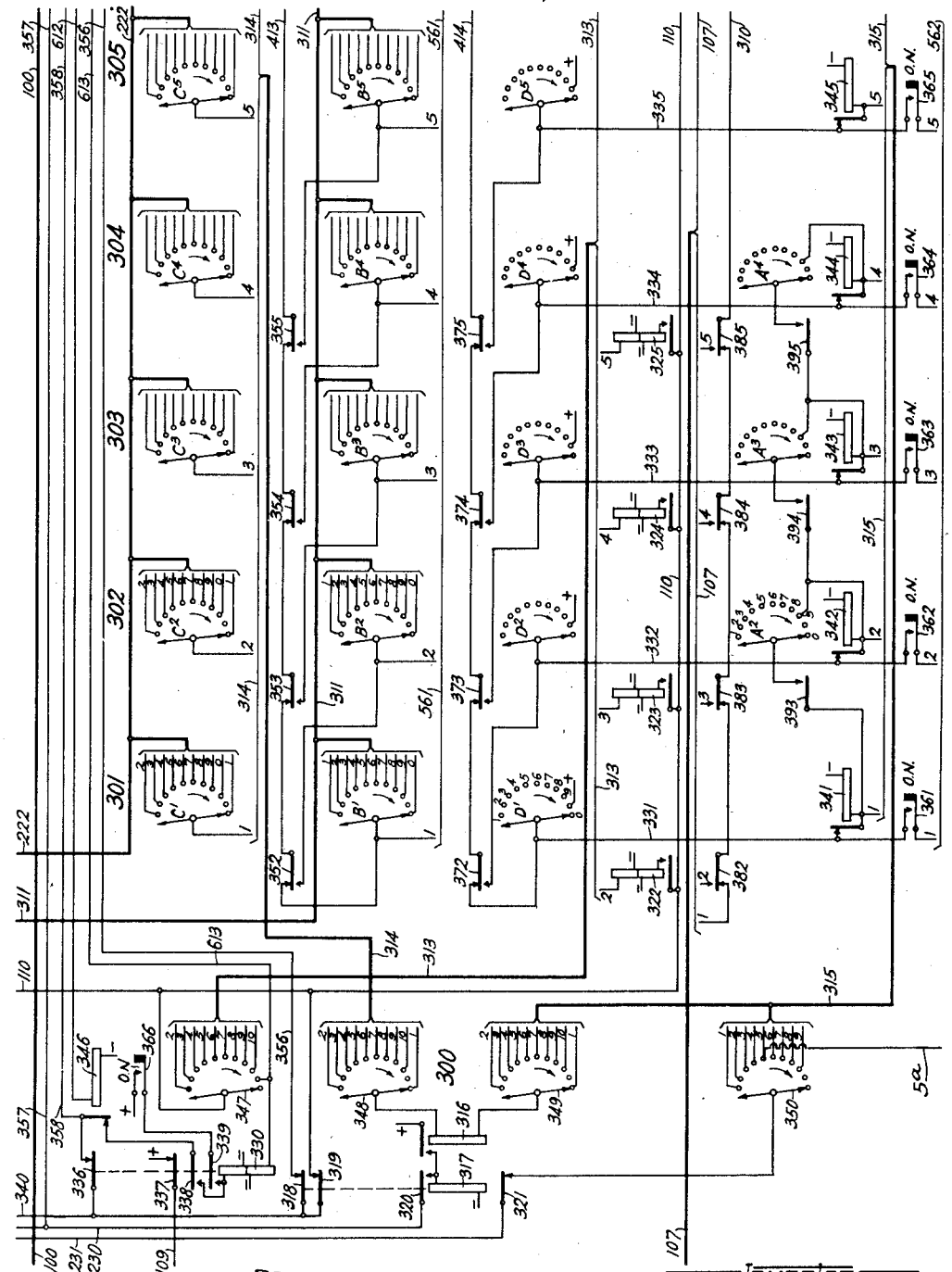

Figure 10 is a timing chart on an enlarged scale, showing the timing of the register transfer operation, including the operation of relays 220, 316, 317 and the magnet 346 of the transfer switch 300 of Figs. 2 and 3.

Figure 11:
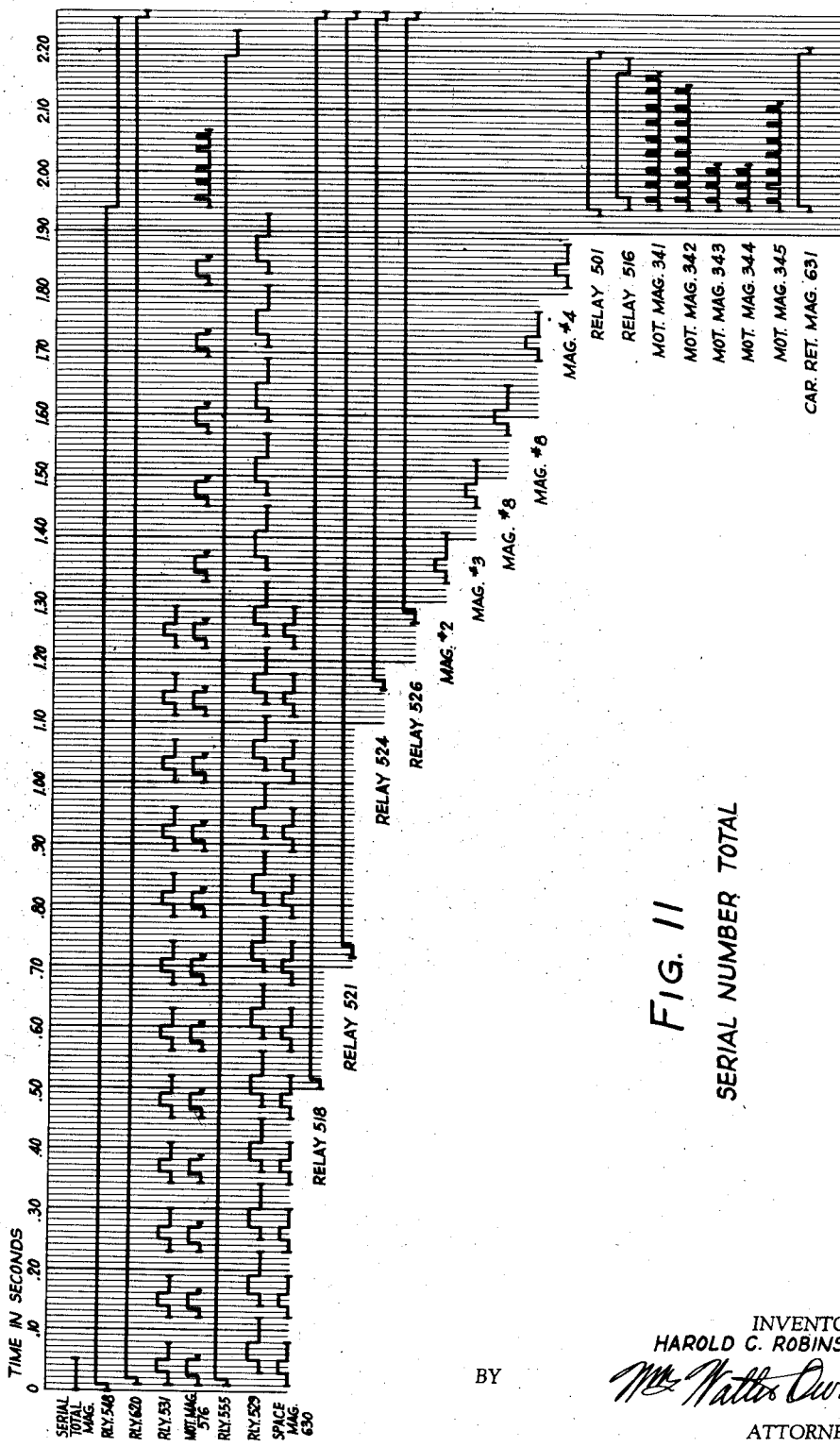

Figure 11 is a timing chart on a smaller scale, showing the operations of the relays and magnets following the operation of the serial total key (Fig. 6) to cause register of the serial number total.

Below Fig. 8 is an explanation chart with legends to show the meaning of the lines on the timing charts. Also on Figures 8 and 9 and 11, due to the smallness of the scale, the time between the opening of make contacts and the closing of break contacts when the relay deenergizes is not shown, and this time is also not shown when the relay is energized. In Figure 10, however, the elapsed time between make and break contacts is shown.

Detailed description

For the sake of description, it will be assumed that the present calculating machine is being employed in a department store for the purpose of securing the total of numbers representing the amount of sales of a great number of articles, which articles are designated by serial numbers. When the present equipment is so used, the register of Fig. 3 will be employed for registering the sum totals of the numbers corresponding to the serial numbers of the articles sold, while the register of Fig. 4 will be used to register the sum totals of the numbers representing the sales prices of the individual articles. The purpose of adding the serial numbers of the various articles is to provide a check against other corresponding totals of serial numbers. Inasmuch as the five lowest orders of digits of the total secured by the addition of several five-digit serial numbers are sufficient to give the proper verification, no means has been associated with the register of Fig. 3 to register the carry-over units when the sum of the fifth orders of digits of any two serial numbers, or several serial numbers, is equal to or greater than ten.

Digit transmission and storage

Figure 4:
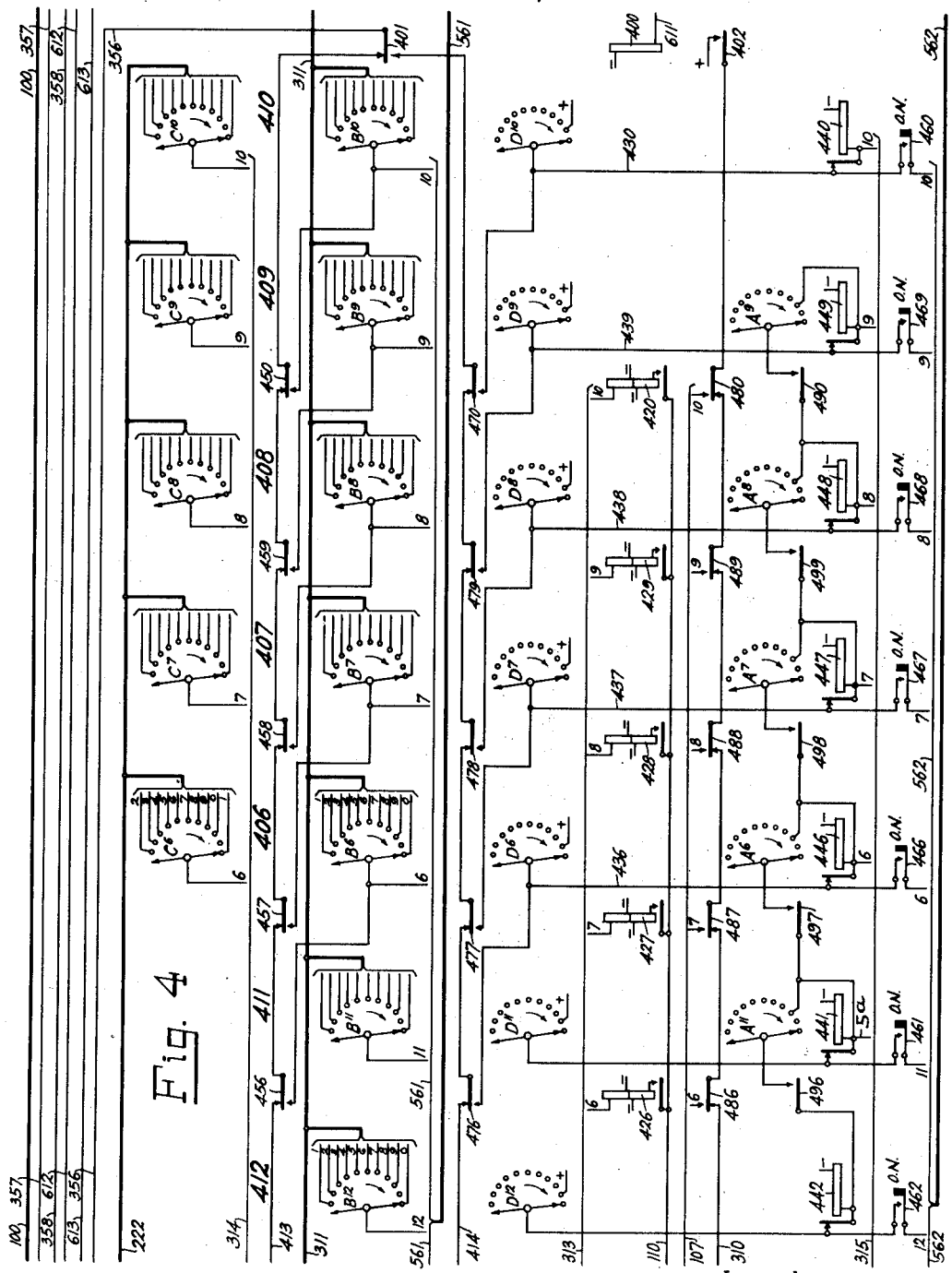

As a starting point for the description, it will be assumed that no number is registered in any of the registers, i. e., the registers of Figs. 3 and 4 are in zero position. The position of each register is indicated by the position of the B wiper of the individual switch.

Assuming, now, that the operator secures several sales tickets of which he desires to obtain a total of the sales prices and the serial numbers, he will write the serial number first and then the number representing the sales price upon the digit-transmitting keys (Fig. 6) by momentarily operating the keys corresponding to the individual numbers constituting the serial number and the sales price. The key corresponding to the highest-order digit of the serial number will be the first key operated and will be followed by the momentary operations of the corresponding keys for the descending order-values of digits. After the key corresponding to the lowest-order digit of the serial number has been momentarily operated, the operator momentarily operates the space key for a purpose to be described subsequently. Following the operation of the space key, the key corresponding to the highest-order digit of the sales price will be momentarily operated, followed by the momentary operations of the keys corresponding to the other digits of the sales price in the descending order-values of digits. Immediately after the key corresponding to the lowest order digit of the sales price has been operated, the operator again momentarily operates the space key.

Assuming that the first serial number is 52,173, digit-transmitting keys #5, #2, #1, #7, and #3 will be depressed momentarily in order and one at a time. Also assuming that the sales price corresponding to this serial in order is $968.40, the digit-keys, Numbers #9, #6, #8, #4, and #0 will be momentarily depressed in order following the depression of the space key.

The momentary depression of digit key 5, which is the first key depressed, momentarily completes the obvious circuit of coding relay 605, which relay thereupon operates and, at its armatures and make contacts, connects positive battery to conductors 2 and 4 of cable 100, which cable may be traced from Fig. 6 through Figs. 5, 4, 3, to Fig. 1. Positive battery on conductors 2 and 4 of cable 100 causes the operation of relays 102 and 104 of the decoding relay group #1, since, as is evident from the drawings, the relay 105¹ is normally in its operated position, connecting the conductors 1 to 4, inclusive, of cable 100 to the relays of the first decoding relay group.

Relays 102 and 104, upon operating, attract their armatures and, at armatures 112 and 114 of relays 102 and 104, respectively, complete a holding circuit for themselves which includes the winding of relay 106¹, conductor 109, and armature 337 and resting contact of relay 330, Fig. 3 to positive battery. Positive battery on conductors 2 and 4 of cable 100 will maintain relay 106¹ short circuited, and, consequently, this relay will not operate until the digit key is released and coding relay 605 is restored.

When the #5 digit key is released, relay 106¹ operates in the above circuit including relays 102 and 104 in parallel, and at its upper armature connects positive battery to conductor 110, and, at its inner-upper armature, opens the circuit of relay 105¹ and closes the circuit of relay 105² by way of armature and resting contact of relay 106² associated with decoding relay group #2.

Relay 105¹ restores when its circuit is opened and disconnects the conductors of cable 100 from the decoding relay group #1, while relay 105² operates, following the operation of relay 106¹, and, at its armature and make contacts, connects the conductors of cable 100 to decoding relay group #2.

As is evident from the foregoing, the digit "5" has been transmitted by means of coded impulses over the cable 100 to the first decoding relay group, wherein it is stored and deciphered by the operation of relays 102 and 104, the storing consisting of the holding of relays 102 and 104 operated in series with relay 106¹ and the deciphering comprising the connection of conductor #1 of cable 107 through back contacts of relay 101, make contacts of relay 102, back contacts of relay 103, and make contacts of relay 104, to conductor #5 of cable 108.

Depression of the #2 key in accordance with the second-highest-order digit of the serial number to be entered causes coded impulses to be transmitted over cable 100 and stored and ciphered in the decoding relay group #2. The relays 105² and 106² function in conjunction with the relays of decoding relay group #2, as did relays 105¹ and 106¹ with the first relay group, to disconnect decoding relay group #2 from cable 100 and connect decoding relay group #3 thereto so that depression of #1 digit key causes the coded impulses to be stored in decoding relay group #3. By this arrangement, it will be seen that the ten digits comprising the serial number and the associated sales price will be stored and deciphered in the decoding relay groups, one digit being entered in each decoding relay group.

*First registration*

Connection of positive battery to conductor 110, by relay 106¹, completes the following circuit: Positive battery, make contact and uppermost armature of relay 106¹, conductor 110, conductor 110 (Fig. 2), conductor 110 (Fig. 3), resting contact and armature 319 of relay 317, conductor 340, armature 318 and resting contact of relay 317, conductor 356, conductor 356 (Fig. 4), armature 401 and resting contact of relay 400 (Fig. 4), armature 450 and its resting contact, armature 459 and its resting contact, armature 458 and its resting contact, armature 457 and its resting contact, armature 456 and its resting contact, conductor 413, conductor 413 (Fig. 3), armature 355 and its resting contact, armature 354 and its resting contact, armature 353 and its resting contact, armature 352 and its resting contact, wiper B1, of register switch 301, normal position contact of that wiper, conductor #0 of cable 311, Figs. 3 and 2, and winding of relay 220, to negative battery.

Relay 220 upon operating in this circuit, at its armature 260 and make contact, connects positive battery to the #0 conductor, or digit line, of cable 221; at its inner-upper armature completes a holding circuit for itself to positive battery on conductor 340 (Figs. 2 and 3); and, at its lower armature, connects positive battery to conductor 230 (Figs. 2 and 3).

The connection of positive battery to the conductor 230 at the lower armature and make contact of relay 220 (Fig. 2) completes the circuit for relay 400 (Fig. 4), by way of conductor 230 (Figs. 2 and 3), conductor 357 (Fig. 3), conductor 357 (Fig. 4), conductor 357 (Fig. 5), conductor 357 (Fig. 6), armature 621 and make contact of relay 620 (Fig. 6), conductor 611, conductor 611 (Fig. 5), conductor 611 (Fig. 4), and through the winding of relay 400 to negative battery. Relay 400 thereupon operates and, at its armature 401, opens the original energizing circuit of relay 220, previously traced, while at the make contact of armature 401, it extends the positive battery on conductor 356 by way of armatures 470, 479, 478, 477, and 476 and their resting contacts, conductor 414 (Figs. 4 and 3), armatures 375, 374, 373, and 372 and their resting contacts, conductor 331, self-interrupting contacts of motor magnet 341, and winding of motor magnet 341 to negative battery. Motor magnet 341 of register switch 301 thereupon operates in a well-known manner, interrupting its own circuit, to step the wipers of register switch 301 step-by-step over their bank contacts.

Relay 400, at its armature 402 and make contact, extends positive battery by way of armatures 480, 489, 488, 487, and 486 and their resting contacts, conductor 310, conductor 310 (Fig. 3), armatures 385, 384, 383, and 382 and their resting contacts, conductor #1 of cable 107, conductor #1 of cable 107 (Fig. 1) to conductor #5 of cable 108 through the contacts of decoding relay group #1 as previously traced, conductor #5 of cable 108 (Fig. 2), and through the winding of computing relay 205 to negative battery. Relay 205 thereupon operates and attracts its armatures into engagement with their make contacts, thereby extending the conductors of cable 221 through the contacts to the conductors of cable 222 for the addition of five to whatever digit may be stored in the register switch 301.

Inasmuch as it has been assumed that the register switch 301 is in its normal, or zero, position, the operation just described results in the registration of the digit "5" in register switch 301. This result is obtained since, with the register switch 301 in its zero position, relay 220 operates, as previously described, and at its armature 260 and make contact connects positive battery to the #0 conductor of cable 221. Therefore, with relay 205 in the operated position, positive battery on the #0 digit line of cable 221 is extended through the make contacts of relay 205 to the #5 conductor, or #5 result line, of cable 222, and is then extended over conductor #5 of cable 222 to the contact of the bank of the C1 wiper of register switch 301 to which the #5 conductor is connected, which, in the example shown, is the fourth contact of the bank of wiper C1.

This condition exists until the motor magnet 341 has operated four times, that is, until the wipers have been moved into engagement with their fourth bank contacts, whereupon, wiper C1 encounters the positive battery on the #5 conductor of cable 222 and extends it by way of conductor #1 of cable 314, through the normal position contact of the bank of wiper 348 of sequence switch 300 to which the #1 conductor of cable 314 is connected, wiper 348, winding of relay 316, wiper 349, normal position contact, conductor #1 of cable 315, and winding of motor magnet 341 to negative battery. Relay 316 does not operate at first since it is short-circuited by the direct positive battery supplied over the automatic stepping circuit including the interrupter springs of motor magnet 341 and the previously traced circuit over conductors 331, 414, armature 401 and its front contact, conductor 356, armature 318 and resting contact, conductor 110, and upper armature of relay 106' to positive battery. Motor magnet 341 energizes, however, preparatory to advancing the wipers of register 301 another step, whereupon the interrupter springs are opened and the short-circuit of relay 316 removed. Relay 316 thereupon operates in series with motor magnet 341 which remains energized ready to advance the wipers as soon as this series circuit is opened. Operation of relay 316 results in the obvious operation of relay 317.

Referring back, for the moment, to the place in the description where positive battery was connected from conductor 110 to conductor 340 by way of armature 319 and resting contact of relay 317, it will be noted that this positive battery is extended by way of armature 336 and resting contact of relay 330, conductor 358 (Figs. 3, 4, 5, and 6), armature 622 and resting contact of relay 620 (Fig. 6), conductor 612 (Figs. 6, 5, 4, and 3), and through the winding of motor magnet 346 of sequence switch 300 to negative battery. Motor magnet 346 energizes in this circuit and remains so, until its circuit is opened, without advancing the wipers of the sequence switch 300.

Relay 317 operates when its circuit is closed by relay 316 and attracts its armatures 318 to 321, inclusive, at its armature 320, completing a temporary holding circuit for itself to positive battery on conductor 230 through the lower armature and make contact of relay 220 (Fig. 2); and at its armature 319, disconnecting conductor 340 from conductor 110, thereby opening the circuit of motor magnet 346 (just traced), and opening the automatic stepping circuit of motor magnet 341 of register switch 301. By reference to the timing chart of Figure 10, the relation of the time of opening and closing of the contacts of relays 317, 316, and 220 may be observed.

Motor magnet 346 of sequence switch 300 deenergizes, when its circuit is thus opened, and advances the wipers 347 to 349, inclusive, out of engagement with their normal position contacts and into engagement with the first contacts of their respective banks. The stepping of the wipers 348 and 349 out of engagement with their normal position contacts opens the circuit of relay 316 and the motor magnet 341 of register switch 301, whereupon relay 316 deenergizes and motor magnet 341 deenergizes to advance the wipers of register switch 301 into engagement with their fifth position contacts, in which position wiper B1 is in engagement with the contact to which the #5 conductor of cable is connected, thus registering the digit "5" in this register.

The advancement of wiper 347 into engagement with its first position contact extends positive battery from conductor 110 by way of conductor #2 of cable 313 through the upper winding of relay 322 to negative battery. Relay 322 thereupon operates, and at its inner lower armature, locks itself to positive battery on conductor 110 by way of its lower winding, at its armature 352 disconnects wiper B1 of register switch 301 from conductor 413 and connects wiper B2 of register switch 302 to that conductor, at its armature 372 opens the automatic stepping circuit of register switch 301 and prepares the automatic stepping circuit of register switch 302, and, at its armature 382, disconnects conductor #1 of cable 107 from conductor 310 and connects conductor #2 of cable 107 to conductor 310.

Removal of the positive battery from conductor 340 by relay 317 also opens the holding circuit of relay 220, Fig. 2, whereupon that relay deenergizes and removes the positive battery from conductor 230, thereby opening the holding circuit of relay 317. This holding circuit of relay 317 is only temporarily closed in the normal operation until relay 220, the circuit of which was opened at springs 319, restores its armature. The purpose of this locking circuit is to maintain relay 317 energized long enough to insure that the relay such as 220 has deenergized before the relay 317 is allowed to fall back. Relay 317 now retracts and at its armatures 319 and 318 reconnects the positive battery to conductor 356 to prepare at that point the circuit of the computing relay of the lower row of relays of Fig. 2 corresponding to the position of wiper B2 of register switch 302, and prepares the automatic stepping circuit of register switch 302.

Removal of positive battery from conductor 230 by the deenergization of relay 220 results in the removal of positive battery from conductor 357, and consequently the opening of the previously-traced circuit of relay 400, Fig. 4. Relay 400 thereupon deenergizes and at its armature 402 removes the positive battery from conductor #1 of cable 107, and consequently from conductor #5 of cable 108, whereupon relay 205, Fig. 2, restores.

With relays 317 and 400 restored, the positive battery on conductor 110 is again extended, as previously traced, to conductor 413 (Fig. 3). At this time, however, with armature 352 of relay 322 in its attracted position, this positive battery is extended to wiper B2 of register switch 302 and its normal position contact to the #0 conductor of cable 311. The connection of positive battery to the #0 conductor of 311 again results in the operation of relay 220 (Fig. 2), whereupon that relay again connects positive battery through its armature 260 and make contact to the #0 conductor, or digit line, of cable 221, at its inner-upper armature, again locks itself to the conductor 340, and, at its lower armature and make contact, completes the previously-traced circuit for relay 400 (Fig. 4) by way of conductor 230 (Figs. 2 and 3) and conductor 357 (Fig. 3).

Relay 400 thereupon operates for the second time, and, at its armature 401, completes the automatic stepping circuit of register switch 302 by way of conductor 414 and conductor 332 since, at this time, armature 372 is in engagement with its make contact. Relay 400 also, at its armature 402, connects positive battery to conductor #2 of cable 107, which results in the connection of positive battery to that conductor of cable 108 which corresponds with the number stored in decoding relay group #2.

Since the digit "2" is entered in decoding relay group #2, the positive battery of the #2 conductor of cable 107 is connected to the #2 conductor of cable 108, resulting in the operation of relay 202, Fig. 2. With this condition, the positive battery on the #0 conductor of 221 is extended through the make contacts of relay 202 to the #2 conductor, or #2 result line, of cable 222, thereby marking the first contact in the bank of wiper C2 of register switch 302 with positive battery. Thus, when the wiper C2 of register switch 302 is advanced by the operation of motor magnet 342, relay 316 operates over the following circuit: positive battery on #2 conductor of cable 222, first position contact of wiper C2 of register switch 302, conductor #2 of cable 314, first position contact and wiper 348 of sequence switch 300, winding of relay 316, wiper 349, first position contact of that wiper, conductor #2 of cable 315, and through the winding of motor magnet 342 to negative battery. Thereupon, relay 316 functions as previously described after its short circuit over conductor 332 and back contact of magnet 342 is removed to complete the circuit of relay 317, which causes the removal of positive battery from conductors 340, 356, and 358, whereupon sequence switch 300 is advanced to its second position and the holding circuit of relay 220 (Fig. 2) is opened, as is also the automatic stepping circuit of motor magnet 342. Restoration of relay 220 results in the restoration of relay 400 (Fig. 4) by the removal of positive battery from conductors 230 and 357.

Stepping of the sequence switch to its second position opens the circuit of relay 316 and motor magnet 342, causing the release of relay 317, following removal of positive battery from conductor 230, and the stepping of the wipers of register switch 302 into their second position.

With sequence switch 300 in its second position, the circuit of relay 323 is completed by way of positive battery on conductor 110, wiper 347, conductor #3 of cable 313, and upper winding of relay 323, to negative battery. Relay 323 thereupon operates, locks itself to conductor 110 by way of its lower winding and inner-lower armature, at its armature 353 and make contact, connects wiper B3 of register 303 to conductor 413 in place of wiper B2 of register 302, at armature 373 opens the automatic stepping circuit of register switch 302 and prepares the automatic stepping circuit of register switch 303, at armature 383 disconnects conductor 310 from the #2 conductor of cable 107, connecting the #3 conductor of cable 107 to conductor 310, and, at armature 393, connects the motor magnet 341 of register switch 301 to wiper A2 of register switch 302 for a purpose to be described subsequently.

This time when relay 317 deenergizes and reconnects the positive battery from conductor 110 to conductor 356, positive battery will be reconnected to the #0 conductor of cable 311 through the B3 wiper of register 303 and its zero position contact. Likewise, following the operation of relay 400, upon the operation of relay 220 (Fig. 2), positive battery is connected to conductor 310 by way of armature 402 of relay 400, through armature 383 and make contact of relay 323 to conductor #3 of cable 107, and consequently through the contacts of the decoding relay group #3 to the conductor of cable 108 corresponding to the numeral stored in this decoding relay group.

Following the operation of relay 323 as explained, the digit entered in the decoding relay group #3 is registered in register switch 303 and, successively, the digits entered in the fourth to tenth decoding relay groups are registered in register switches 304, 305, 406, 407, 408, 409, and 410, respectively, since the registration of a digit in each of these registers is preceded by the operation of the associated one of relays 324, 325, 426, 427, 428, 429, and 420.

By means of the following transmission table, the results of the operation of a digit-transmitting key can readily be determined up to the operation of one of the computing relays 201 to 210, inclusive.

*Transmission table*

| No. of digit key operated (Fig. 6) | Coding relay operated (Fig. 6) | Wires of cable 100 (Figs. 5 to 1) to which positive battery is connected by coding relays | Decoding relays operated (Fig. 1) | Wire of cable 100 (Figs. 1 and 2) to which positive battery is connected by decoding relays | Computing relay operated (Fig. 2) |
|---|---|---|---|---|---|
| 1 | 601 | 1 and 2 | 101 and 102 | 1 | 201 |
| 2 | 602 | 1 and 3 | 101 and 103 | 2 | 202 |
| 3 | 603 | 1 and 4 | 101 and 104 | 3 | 203 |
| 4 | 604 | 2 and 3 | 102 and 103 | 4 | 204 |
| 5 | 605 | 2 and 4 | 102 and 104 | 5 | 205 |
| 6 | 606 | 3 and 4 | 103 and 104 | 6 | 206 |
| 7 | 607 | 1 | 101 | 7 | 207 |
| 8 | 608 | 2 | 102 | 8 | 208 |
| 9 | 609 | 3 | 103 | 9 | 209 |
| 0 | 610 | 4 | 104 | 0 | 210 |

By means of the following computing table, the additions performed by the computing relays can readily be determined, the previously registered digit value being denoted by the marked one of the conductors of cable 221, which are termed the digit lines, the value of the digit to be added thereto by one of the conductors of cable 108, and the result by one of the conductors of cable 222, which are termed the result lines.

*Computing table*

| Digit line having positive battery thereon | Result line to which positive battery is connected by operation of computing relays | | | | | | | | | |
|---|---|---|---|---|---|---|---|---|---|---|
| | 201 | 202 | 203 | 204 | 205 | 206 | 207 | 208 | 209 | 210 |
| 0 | 1 | 2 | 3 | 4 | 5 | 6 | 7 | 8 | 9 | 0 |
| 1 | 2 | 3 | 4 | 5 | 6 | 7 | 8 | 9 | 0 | 1 |
| 2 | 3 | 4 | 5 | 6 | 7 | 8 | 9 | 0 | 1 | 2 |
| 3 | 4 | 5 | 6 | 7 | 8 | 9 | 0 | 1 | 2 | 3 |
| 4 | 5 | 6 | 7 | 8 | 9 | 0 | 1 | 2 | 3 | 4 |
| 5 | 6 | 7 | 8 | 9 | 0 | 1 | 2 | 3 | 4 | 5 |
| 6 | 7 | 8 | 9 | 0 | 1 | 2 | 3 | 4 | 5 | 6 |
| 7 | 8 | 9 | 0 | 1 | 2 | 3 | 4 | 5 | 6 | 7 |
| 8 | 9 | 0 | 1 | 2 | 3 | 4 | 5 | 6 | 7 | 8 |
| 9 | 0 | 1 | 2 | 3 | 4 | 5 | 6 | 7 | 8 | 9 |

It is now evident that, with all register switches in the zero position, positive battery is connected to the #0 conductor, or #0 digit line, of cable 221 each time one of the register switches is selected for the registration of a digit by the sequence switch 300. Therefore, the digit that is registered in each register switch as it is selected corresponds to the digit key operated since the number of the conductor of cable 222, that is, the result line having positive battery extended thereto from the #0 conductor of cable 221, corresponds with the digit stored in the decoding relay group corresponding to the selected register switch.

Therefore, in accordance with the assumed serial number of 52,173, the digit "5" is registered in register switch 301, the digit "2" in register switch 302, the digit "1" in register switch 303, the digit "7" in register switch 304, and the digit "3" in register switch 305. Likewise, in accordance with the assumed sales price of $968.40, the digit "9" of this price is registered in register switch 406, the digit "6" in register switch 407, the digit "8" in register switch 408, the digit "4" in register switch 409, and the digit "0" in register switch 410.

When the sequence switch 300 is stepped from its position 9 to its position 10 following the registration of the tenth digit in the register switch 410, wiper 347 leaves its ninth contact, to which conductor #10 of cable 313 is connected, and engages its tenth position contact, in which position the positive battery on conductor 110 is extended by way of wiper 347 and tenth position contact to the lower winding of relay 330. It will be noted that there are no connections made to the tenth position contacts of wipers 348 and 349. Therefore, in the tenth position of sequence switch 300, no operation of relays 316 and 317 will occur.

Relay 330 operates, when the circuit of its lower winding is closed through wiper 347, and, at armatures 338 and 339, extends positive battery, supplied through the off-normal springs 336 of sequence switch 300, which were closed when the sequence switch 300 stepped from its normal position to its first position, to conductor 358 through the self-interrupting contacts of motor magnet 346, and thence through the winding of motor magnet 346 to negative battery over the circuit previously described. Motor magnet 346 operates, interrupting its own circuit at its interrupter contacts and advancing the wipers of sequence switch 300 from the tenth to the normal position. Advancement of the sequence switch out of its tenth position, at wiper 347, opens the circuit of the lower winding of relay 330 and, by separating the off-normal springs 366, opens the locking circuit which includes the upper winding of that relay. Relay 330 thereupon deenergizes, and, at its contacts 338 and 339, opens the energizing circuit of magnet 346.

When relay 330 is first operated upon the advancement of the sequence switch to its tenth position, at its armature 337, it disconnects positive battery from conductor 109 (Figs. 2 and 1), thereupon opening the locking circuit of all of the relays of the ten decoding relay groups, which locking circuit includes the relays 106, thereby causing the restoration of all storage relays and all relays 106. Upon the restoration of relay 106¹, at its uppermost armature, that relay disconnects positive battery from conductor 110, thereby causing the restoration of relays 322, 323, 324, 325, 426, 427, 428, 429, and 420, these relays which have been locked up to conductor 110 now release and thereupon conditioning the two sets of registers for the reception of further impulses. Relay 106¹, at its inner-upper armature and resting contact, recloses the circuit of relay 105¹, whereupon the decoding relay group #1 is connected to the conductors #1 to #4, inclusive, of cable 100, preparatory to the reception of the first of a second series of coded impulses.

*Second registration*

The operator, having registered the first serial number and the first sales-price in the respective registers, now operates the digit-transmitting keys in accordance with the digits of the second serial number and the second sales-price to perform the addition of the two corresponding sets of digits. Assuming the second serial number to be 35,467 and the second sales-price to be $123.98, the operator momentarily depresses the digit keys one at a time in the following order: Digit keys #3, #5, #4, #6, #7, #1, #2, #3, #9, and #8. The space key is operated after digit key #7 and again after key #8. The coding relays respond to the operation of the transmitting keys to transmit the coded impulses to the decoding relay groups in Fig. 1, whereupon the digits are entered in sequence in the decoding relay groups #1 to #10, inclusive.

Upon the operation of relay 106¹ at the end of the first coded impulse, positive battery is reconnected to conductor 110, and, as previously described, to conductor 413 by way of conductor 356 and armature 401 and resting contact of relay 400. Inasmuch as all of the armatures in this circuit are in engagement with their resting contacts, the positive battery is extended to wiper B1 of register switch 301. Since the wiper B1 is now in engagement with the contact to which the #5 conductor of cable 311 is connected, the positive battery is extended by way of this conductor to relay 215, Fig. 2. Relay 215 thereupon operates, and, in so doing, locks itself to conductor 340, connects positive battery to conductor 230 at its lower armature and make contact, at its armature 255 and make contact connects positive battery to the #5 conductor of cable 221, and at its armature 245 and make contact prepares the carry-over circuit to be described subsequently.

Connection of positive battery to conductor 230 results in the operation of relay 400, as previously described, which thereupon operates and extends the positive battery on conductor 356 to conductor 331, Fig. 3, to start the automatic stepping of register switch 301. The operation of relay 400 also connects positive battery to conductor #1 of cable 107 for the transmission of an impulse in accordance with the digit stored in decoding relay group #1. By reference to the transmission table, it is determined that operation of digit key #3 in accordance with the first digit of the serial number results in the operation of computing relay 203, and, by reference to the computing table, it is determined that the positive battery on conductor #5 of cable 221 is extended to conductor #8 of cable 222. Consequently, positive battery is extended to the seventh position contact of wiper C1 of register switch 301 to which the #8 conductor of cable 222 is connected.

Motor magnet 341 of register switch 301, by interrupting its own circuit, advances the wipers of register switch 301 to seek the positive battery marking on the bank of wiper C1. With wiper C1 of register switch 301 picking up positive battery in its seventh position, and with wipers 348 and 349 in their normal position, relay 316 is operated in series with motor magnet 341, when register switch 301 reaches its seventh position, and is followed by the operation of relay 317, whereupon the advancement of the sequence switch one step and the advancement of register 301 one step are brought about as previously explained. The operation of relay 317 and the advancement of the sequence switch result in the restoration of computing relays 215 and 203. Operation of relay 322, upon completion of its circuit through wiper 347, opens the automatic stepping circuit of register 301 and prepares the automatic stepping circuit of register 302 so that the next impulse, coming from the decoding relay group #2, is employed to determine the extent of operation of register 302.

Upon the restoration of relay 317, positive battery is again connected to conductor 356 and, by way of armature 401 and resting contact of relay 400, to wiper B2 of register 302 since armature 352 of relay 322 is in engagement with its make contact. Since wiper B2 is in engagement with its second bank contact, this positive battery is extended by way of conductor #2 of cable 311 to computing relay 212, which relay thereupon operates and, in a manner similar to that of relays 215 and 220, brings about the operation of relay 400. Since relay 322 is in its operated position, operation of relay 400 connects positive battery to conductor #2 of cable 107, resulting in the operation of computing relay 205 in accordance with the digit stored in decoding relay group #2. Thus, the positive battery of the #2 conductor of cable 221, placed there by the operation of computing relay 212, results in the advancement of sequence switch 300 when wiper C2 engages the contact to which the #7 conductor of cable 222 is connected, and the same sequence of operations is performed as in the case of the previous digit to advance the wiper B2 of register switch 302 into its seventh position and the preparation of register switch 303 for operation to register the addition performed responsive to the reception of the impulse corresponding to the third digit of the serial number.

Since the register switch 303 has its wiper B3 in its first position, computing relay 211 is operated, following the restoration of relays 317 and 400 after the sequence switch advances into its second position, and the register switch 303 is advanced to its fifth position in accordance with the impulse received from the #3 decoding relay group.

At this stage of the operation, the register switches 301, 302, and 303 are standing with their wipers in the positions indicating the sum of the three highest orders of digits of the two serial numbers, namely, 875.

Following registration of the addition of the digit "4" to the digit "1" in register switch 303, the sequence switch 300 advances to its third position, in which position register switch 304 is rendered effective.

Since register switch 304 is standing with its wipers in the seventh position, the addition of the digit "6" to the digit "7" registered therein at this time causes the motor magnet 344 of register switch 304 to advance the wipers through the tenth and normal positions to their second position, in which position the wiper C4 encounters positive battery on conductor #3 of cable 222, causing the advancement of the sequence switch to its fourth position and the advancement of wipers of register switch 304 to their third position, thus registering the units digit 3.

Since the sum of the two digits being added in this case is greater than 10, there must necessarily be a carry-over operation performed. This operation is obtained through the cooperation of the computing relays 217 and 206 in accordance with the first digit registered in register switch 304 and the second digit being added therein. By reference to Fig. 2, it will be noted that, whenever two digits whose sum is equal to or greater than ten are added together, a circuit is completed from positive battery by way of the lower armature and make contact of the operated relay of the upper row of computing relays, and thence by way of the uppermost armature and make contact of the operated one of the lower row of computing relays and over conductor 231 (Figs. 2 and 3) to wiper 350 of sequence switch 300. In the present example, this circuit is from positive battery through lower armature and make contact of relay 206, armature 244 and resting contact of relay 214, armature 245 and resting contact of relay 215, armature 246 and resting contact of relay 216, armature 247 and make contact of relay 217, conductor 231 (Figs. 2 and 3), armature 321 and resting contact of relay 317, wiper 350 of sequence switch 300, third position contact of this wiper, conductor #3 of cable 315, winding of motor magnet 343 of register switch 303, to negative battery. Motor magnet 343 energizes in this circuit and remains energized until relay 317 operates, following the operation of relay 316 upon the encountering of positive battery by wiper C4 of register switch 304, whereupon magnet 343 deenergizes and advances the wipers of register switch 303 into the next position, which in the present example is the sixth position, thereby registering the tens digit of the addition in register switch 303. Thus, it can be seen that whenever any two digits whose total is ten or greater are registered in one register, the register of the next-higher order of digits is advanced one step to register the carry-over unit. At this stage of the operation, the total 8763 is now registered upon the register switches 301 to 304, inclusive.

When sequence switch 300 is advanced to its fourth position following the registration of the result of the fourth addition in register switch 304, the wipers of register switch 305 are automatically advanced from the third position to the zero position in accordance with the digit "7" of the second serial number. Since the sum of these two digits is equal to ten, another carry-over circuit is completed from positive battery, make contact and lower armature of relay 207, armature 241 and resting contact of relay 211, armature 242 and resting contact of relay 212, armature 243 and make contact of relay 213, conductor 231 (Figs. 2 and 3), armature 321 and resting contact of relay 317, wiper 350 of sequence switch 300, fourth position contact of wiper 350, conductor #4 of cable 315, and through the winding of motor magnet 344 of register switch 304, to negative battery. Therefore, when relay 317 operates preparatory to the advancement of the sequence switch 300 to its fifth position, motor magnet 344 causes the advancement of the wipers of register switch 304 to their fourth position, whereby the carry-over unit is registered in register switch 304. Thus the number 87,640 corresponding to the sum of the two serial numbers transmitted from the digit-transmitting keys (Fig. 6) is registered in the register switches 301 to 305, inclusive.

Upon advancement of the sequence switch 300 to the fifth position following the addition of the last digits of the two serial numbers, relay 426 operates and locks to conductor 110, conditioning register switch 406 preparatory to the registration of the result of the addition of the first digit of the second sales-price stored in the decoding relay group #6 and the digit stored in register switch 406. Since at this time the wipers of register switch 406 are standing in their ninth position, computing relay 219 operates. Computing relay 201 operates following the operation of relay 400, whereupon positive battery is connected by way of the #0 conductor of cable 222 to the ninth contact of wiper C5 of register switch 406. Therefore, as the wipers are already in their ninth position, wiper C6 encounters the positive battery on the #0 conductor of cable 222, resulting in the operation of relays 316 and 317 to cause the advancement of the sequence switch to its sixth position and the advancement of register switch 406 to the tenth position.

Since the sum of these two digits is ten, a carry-over circuit is completed by relays 201 and 209 through wiper 350 in its fifth position to motor magnet 441 of register switch 411. Therefore, when the sequence switch is advanced to the sixth position as just described, the register switch 411 is advanced from its zero position to its first position to register this carry-over unit.

It should be noted that the No. 5 contact in the bank of sequence switch wiper 350, Fig. 3, is not multipled with the banks of wipers 347, 348, and 349 as are the remaining contacts, but this contact is connected by an individual wire 5a to the motor magnet 441 of the register switch 411, Fig. 4, so that carry-overs from register 406 are registered in the switch 411 and not in the switch 305.

When the wipers of register switch 406 are advanced to the tenth position, wiper D6 of that register switch encounters positive battery, thereby completing the circuit of motor magnet 446 of register switch 406 to cause that magnet to advance the wipers of register switch 406 to the zero position.

With sequence switch 300 in its sixth position, relay 427 is operated to thereby prepare register switch 407 for operation. Since the wipers of register switch 407 are in the sixth position and the digit "2" is now to be added to the digit "6", registered therein, the wipers are advanced to the eighth position and the sequence switch is advanced to the seventh position, whereupon relay 428 is operated and register switch 408 conditioned for operation.

Since the wipers of register switch 408 are standing on their eighth position contacts, the addition of the digit "3" to the digit "8" at this time causes the wipers to be advanced through the tenth and zero positions to the first position, which position is indicative of the units digit of the sum of the two digits being added at this time. Since at this time computing relays 218 and 203 are operated, a carry-over circuit is completed through wiper 350 of sequence switch 300 in its seventh position to motor magnet 447 of register switch 407 to cause the registration of the carry-over unit in this register.

Following these operations of register switches 407 and 408, sequence switch 300 is advanced to the eighth position, whereupon register switch 409 is conditioned for operation.

Addition of the digit "9" to the digit "4" already registered in register switch 409 causes the wipers of register switch 409 to be advanced through their zero position to the third position, and causes the advancement of the sequence switch from its eighth position to its ninth position. In accordance with the carry-over to be performed at this time, because of the operated condition of relays 219 and 204, the wipers of register switch 408 are advanced from their first to their second position. This operation of register switch 408 for the registration of the carry-over unit is performed, of course, before the advancement of the sequence switch to its ninth position.

Since at this time the wipers of register switch 410 are standing in their zero position, they are advanced therefrom to their eighth position in accordance with the last digit of the sales price. Likewise, sequence switch 300 is advanced from its ninth position to its tenth position, whereupon relay 330 is operated, as previously described, to restore all of the operated relays of the decoding relay groups and cause the reconnection of the decoding relay group #1 to the conductors of cable 100 preparatory to the reception of a third series of impulses. Sequence switch 300 thereupon advances from its tenth to its zero position under the influence of relay 330 and the motor magnet 346.

At this stage of the operation the number 87,640, corresponding to the total of the two serial numbers, is registered upon the register switches 301 to 305, inclusive, while the total $1,092.33, corresponding to the sum of the two sales prices, is registered upon the register of Fig. 4.

Third registration

It will now be assumed that the operator desires to add another number to each of the totals in the registers, and that these numbers are serial number 36,244 and sales price $995.61. The operator thereupon operates the digit-transmitting keys and the space key as previously explained to enter these numbers in the decoding relay groups. By reference to the transmission table and to the computing table, and by bearing in mind the positions of the wipers of the various register switches, it can readily be determined which bank contact of the C wiper of each register switch will have positive battery connected thereto as each register switch is rendered operative upon the advancement of the sequence switch to the corresponding position, since, as is evident from the foregoing description, the one of the computing relays 211 to 220, inclusive, operated is easily determined by the position of the B wiper of each register switch.

Since the wipers of register switch 301 are in the eighth position, the addition of the digit "3" to the digit "8" registered therein results in the advancement of the wipers from the eighth through the zero position to the first position. The carry-over unit in this case will not be registered in any register switch, since, as previously explained, it is not desired and no equipment has been provided for such registration.

When sequence switch 300 advances from its normal position to its first position, the wipers of register switch 302 are advanced from their seventh position through the zero position to the third position in accordance with the digit "6" of the third serial number, and the wipers of register switch 301 are advanced from their first to their second position to register the carry-over unit.

When sequence switch 300 advances to its second position, the wipers of register switch 303 are advanced from their sixth position to their eighth position by the addition of the digit "2" to the digit already registered therein. In the third position of sequence switch 300, the wipers of register switch 304 are advanced from their fourth position to their eighth position, while in the fourth position of sequence switch 300 the wipers of register switch 305 are advanced from their zero position to their fourth position.

At this stage, the number now registered in the serial number register, that is, in the register switches 301 to 305, inclusive, is 23,884, which corresponds to the five lowest orders of digits of the serial number total.

In the fifth position of sequence switch 300, the wipers of register switch 406 are advanced from the zero position to the ninth position in accordance with the highest-order digit of the third sales price.

In the sixth position of sequence switch 300, the wipers of register switch 407 are advanced from the ninth position through the zero position to the eighth position, and the wipers of register switch 406 are advanced from the ninth to the tenth position to register the carry-over unit in register switch 406. However, with the wiper A6 of register switch 406 in its ninth position, the positive battery supplied to motor magnet 446 over the carry-over circuit from the computing relays is also extended by way of ninth position contact and wiper A6, and thence by way of make contact and armature 497 of relay 427, and through the winding of motor magnet 441 of register switch 411 to negative battery, since relay 427 was operated by the advancement of sequence switch into its sixth position. Thus, when relay 317 operates to open the circuit of motor magnet 446 at its armature 321 and resting contact, it also opens the circuit of motor magnet 441, causing, in addition to the advancement of the wipers of register switch 406 to the tenth position, the advancement of the wipers of register switch 411 from their first to their second position.

Advancement of wiper D6 of register switch 406 to its tenth position completes the obvious circuit of motor magnet 446, causing the advancement of the wipers of this register to the zero position.

Thus, it can be seen that the registration of the result of the addition of the two digits in register switch 407, the sum of which digits is greater than ten, results in the advancement of register switch 406 and, since the addition of the carry-over unit in register switch 406 to the digit "9" already registered therein gives a total of ten, results in the advancement of the register switch 411, thereby causing the carry-over operations to be performed in two distinctive manners.

In the seventh position of sequence switch 300, the wipers of register switch 408 are advanced from the second to the seventh position in accordance with the addition of the third digit of the third sales price. In the eighth position of sequence switch 300, the wipers of register switch 409 are advanced from the third to the ninth position, and in the ninth position of switch 300 the wipers of register switch 410 are advanced from the eighth to the ninth position.

When enough additions have been performed to cause the carry-over total in register switch 411 to be increased to ten, the positive battery extended through wiper A6 and through the make contact and armature 497 of relay 427 to motor magnet 441, upon the advance of register switch 411 from the ninth to the tenth position, is also extended in parallel thereto by way of ninth position contact and wiper A11 of register switch 411 and make contact and armature 496 of relay 426 to motor magnet 442 of register switch 412. Thereby, the simultaneous advancement of the wipers of register switches 411 and 412 is brought about, the wipers of register switch 411 being advanced to the tenth position and the wipers of register switch 412 being advanced to the first position. By means of wiper D11 of register switch 411, the motor magnet 441 is caused to advance the wipers to the zero position whenever they are advanced into the tenth position.

At this stage of the operation, the serial number total of the three serial numbers, that is, the number of digits of the total corresponding to the number of digits in the serial number, is registered upon the register switches 301 to 305, inclusive. Other serial numbers and other sales prices can be added to these totals, as desired by the operator, merely by the operation of the digit keys as explained.

From the foregoing, it will be appreciated that, whenever two digits being added together attain a total equal to or greater than ten, the carry-over unit is added to the next higher order of digits; and that, in such cases where the addition of this carry-over unit to the next higher order register increases the total therein to ten, another carry-over operation is performed to the second higher order of register switches. It will also be appreciated that the operator can operate the digit keys substantially as fast as desired, since, by means of the decoding relay groups, these digits are stored and transmitted in sequence to the registers as quickly as the registers are able to take care of them. This obviates the necessity of the operator's having to time the operation of the digit transmitting keys in accordance with the ability of the registers to function to register the digits.

*Recording operations of digit keys*

By referring to Fig. 6, it will be apparent that, with relay 620 deenergized, any operation of one of the digit-transmitting keys operates the correspondingly-numbered magnet associated with the electromatic printer. Therefore, it can be seen that the writing of a serial number upon the digit-transmitting keys causes the electromatic printer to print that serial number. The operation of the space key, following the operation of the digit-transmitting key corresponding to the fifth digit of the serial number, completes through the left-hand pair of springs the obvious circuit of space magnet 630, thereby causing the electromatic printer to insert a space on the recording paper after the serial number is printed. Consequently, when the digit-transmitting keys are operated in accordance with the sales price, the electromatic printer prints the sales price on the recording paper. Because of the operation of the space key, the serial number and sales price are separated by a blank space and are readily discernible one from the other. The electromatic printer is provided with two sets of springs, 632 and 633, which are mechanically operated by the movement of the printer carriage. For example, they may be secured to the frame of the printer in operative relation to the tabular stops thereof. The mechanism of this part of an "Electromatic" is disclosed in Crumrine Patent No. 1,837,898, issued December 22, 1931. Springs 633 are held out of engagement with each other when the carriage is in its normal position, being allowed to move into engagement with each other when the carriage takes its first step after the printing of the first digit of the serial number. Springs 632 are arranged to be moved into engagement with each other when the carriage moves from its eleventh to its twelfth position upon the printing of the last digit of the sales price, thereby preparing a circuit for the carriage-return magnet 631, which circuit is completed by the space key upon the operation of this key after the operation of the digit-transmitting key corresponding to the last digit of the sales price. Carriage-return magnet 631 operates when its circuit is closed by the operation of the space key and contact 632 and causes the return of the printer carriage to its normal position. Therefore, when the next serial number is written upon the transmitting keys, the electromatic printer prints this second serial number directly under the first serial number recorded, and when the digit keys are operated in accordance with the second sales price, following the operation of the space key, the second sales price is printed directly under the first. Operation of the space key, following the transmission of the second sales price and after contact 632 is closed, again operates the carriage-return magnet to return the printer-carriage to its normal position. By this arrangement, all serial numbers are printed in one column and all sales prices are printed in a separate column, as shown in Fig. 7.

*Total taking*

When the operator desires to take a total of all the sales prices, the total can be obtained by operation of either the price-total key or the price sub-total key, the price-total key being operated when it is desired to take a total and to restore the register switches of Fig. 4 to their zero position, thereby erasing the registrations therein, and the price-sub-total key being operated when it is desired to take a total of the sales prices transmitted without erasing the registrations in the sales price register. When it is desired to take a total of the serial numbers transmitted, the serial-total key is operated, whereupon the register switches of Fig. 3 are restored to their zero positions and the registrations therein erased.

By "taking the total" is meant the printing of the total, registered in one of the registers, by the electromatic printer.

*Serial number total*

It will first be assumed that the operator desires to take the total of the serial numbers. Operation of the serial-total key connects positive battery to conductor 642 (Figs. 6 and 5). If the serial-total key is operated when the printer-carriage is out of its normal position, positive battery will be present, through the off-normal springs 633, on conductor 643, resulting in the operation of relay 555, Fig. 5, which at its armatures 556 to 558, inclusive, opens the conductors 640 to 642, inclusive. Therefore, operation of any of the total-taking keys will be ineffective unless the printer-carriage is in its normal position.

Assuming that, when the serial-total key is operated, the printer carriage is in its normal position, that is, with the carriage in its extreme left-hand position looking at the rear of the machine as illustrated in Fig. 6a with the tabular stop 20 holding springs 633 open, as will occur in the next left-hand position from that illustrated in Fig. 6a, relay 555 will not be operated and positive battery connected through the contacts of the serial-total key to conductor 642 causes the operation of relay 548. Upon operating, relay 548 attracts its armatures 549 to 554, inclusive, and at its armature 550, connects positive battery to conductor 582; at its armature 551 completes the circuit of relay 531 by extending the positive battery connected to conductor 582 through resting contact and armature 530 of relay 529, conductor 583, armature 527 and resting contact of relay 526, armature 551 and make contact of relay 548, conductor 580, and winding of relay 531, to negative battery; at its armature 552 and make contact completes a locking circuit for itself to positive battery by way of armature 504 and resting contact of relay 501; at armature 553 connecting positive battery to conductor 584 and consequently to conductor 643; and at armatures 549 and 554 prepares circuits later to be described.

Connection of positive battery to conductor 643 operates relay 555 to disconnect the total keys of Fig. 6 from the equipment of Fig. 5, while connection of positive battery to conductor 582 completes the circuit of relay 620 (Fig. 6), and, in parallel thereto, the circuit of lamp L associated with the digit-transmitting keys, whereby the printer magnets are disconnected from the digit-transmitting keys and connected by way of conductors 1 to 10, inclusive, of cable 311 to the B level of bank contacts of the register switches in Figs. 3 and 4. Lighting of the lamp L warns the operator that the digit keys must not be operated until the serial total has been taken.

Completion of the circuit of relay 531 as described results in the operation of this relay and the completion of the circuit of relay 529 at armature 532 and make contact of relay 531. Relay 529 thereupon operates and at its armature 530 opens the circuit of relay 531, which thereupon deenergizes and opens the circuit of relay 529. Relay 529 thereupon deenergizes, again completing the circuit of relay 531 which operates and in turn operates relay 529. From this interaction of relays 531 and 529, it can be seen that positive battery connected to conductor 582 at armature 550 and make contact of relay 548 is momentarily and repeatedly connected to conductor 583 and consequently at the same time to conductor 580.

The momentary connections of positive battery to conductors 583 and 580 constitute the transmission of impulses over these conductors, the impulses being transmitted over conductor 583 to motor magnet 576 of the register-selecting switch 570, and over conductor 580 to space magnet 630 of the electromatic printer. Therefore, in the well known manner, the register-selecting switch 570 takes one step for each impulse received and the carriage of the electromatic printer also takes one step for each impulse received, the switch and the printer carriage stepping in synchronism.

Inasmuch as wiper 573 of switch 570 is connected to conductor 582, which has positive battery connected thereto as long as relay 548 remains operated, wiper 573 connects positive battery to each of its contacts as the wipers of switch 570 are stepped from position to position. Therefore, when wiper 573 engages its fifth contact, the positive battery is extended by way of the jumper between the fifth and sixth contacts, conductor 586, armature 522 and resting contact of relay 521, and through the winding of relay 518 to negative battery. Relay 518, thereupon, operates, and, at its armature 519 and make contact, prepares a locking circuit for itself to positive battery on conductor 582, which locking circuit includes the winding of relay 521. Relay 521 cannot energize at this time, however, since with positive battery on conductor 586, the winding of relay 521 has positive battery connected to both of its terminals.

Inasmuch as wiper 573 is a bridging wiper, it will bridge contacts 5 and 6 as the wiper is moved from contact 5 to contact 6, thereby maintaining closed the energizing circuit of relay 518 to prevent operation of relay 521 until wiper 573 has moved completely out of position 6.

When wiper 573 moves into engagement with the seventh contact, positive battery is removed from conductor 586 and relay 521 then operates in series with relay 518, and at its armature 522 and make contact, extends conductor 586 to conductor 588 and, at its armature 523 and make contact, extends conductor 587 to conductor 589 by way of armature 554 and make contact of relay 548. Switch 570 continues to step, and, when wiper 573 is moved into its normal position, the positive battery is extended by way of conductor 587, make contact and armature 523 of relay 521, armature 554 and make contact of relay 548, conductor 589, armature 528 and resting contact of relay 526, and through the winding of relay 524 to negative battery. Relay 524 thereupon operates, and, at its armature 525 and make contact, prepares a locking circuit for itself which includes the winding of relay 526. However, relay 526 cannot operate at this time because of the connection of positive battery to both terminals of its winding.

When wiper 573 is again stepped out of its normal position and into engagement with its first bank contact, positive battery is removed from conductor 587, thereby allowing relay 526 to operate in series with relay 524. Upon operating, relay 526 at its armature 528 opens the energizing circuit of relay 524 and, at its armature 527, opens the circuit of relay 531, extending the positive battery on conductor 582, upon the restoration of relay 529, by way of conductor 590, make contact and armature 549 of relay 548, to wiper 572. Since relay 526 remains operated in series with relay 524, the interrupter action of relays 531 and 529 is stopped and consequently the stepping of the switch 570 and the printer-carriage is also stopped.

At this time, the wipers of switch 570 are standing in engagement with their first bank contacts. By this it can be readily determined that twelve impulses have been transmitted over conductor 580 to the space magnet of the electromatic printer. Therefore, the carriage of the electromatic printer has been stepped from its normal position to its thirteenth position, in which position the first digit of the serial total will be printed. Thus, by reference to Fig. 7 it can be seen that the serial number total will be offset from the column in which the serial numbers have been listed and from the column in which the sales prices have been listed. Fig. 7 has been ruled to show the different positions of the printer carriage and the relation of the various printings to these positions. Closure of the contacts 632 in the twelfth position of the printer carriage will have no effect at this time since the space key will not be operated.

The positive battery connected to wiper 572, which wiper is in engagement at this time with the first contact of its bank, is extended over conductor #1 of cable 561, Figs. 5, 4, and 3, to wiper B1 of register switch 301. Since, at this time, wiper B1 is standing in engagement with its second position contact, the positive battery is extended over conductor #2 of cable 311 (Figs. 3, 4, 5, and 6), through the make contacts of relay 620 to printer magnet #2, whereupon this magnet operates, causing the numeral "2" to be printed by the electromatic printer and causing positive battery to be connected to conductor 644 through the make contacts of the #2 printing magnet.

This connection of positive battery to conductor 644 results in the operation of relay 529, Fig. 5.

Returning, now, to the point in the description where the relay 526 first operated, it will be seen that when relay 529 deenergizes, following the operation of relay 526, the positive battery on conductor 582 is reconnected to conductor 583, thereby causing the energization of motor magnet 576 of register-selecting switch 570. Inasmuch as relay 529 now remains inert, the motor magnet 576 remains energized and ready to advance the wipers of switch 570.

Therefore, when relay 529 operates, following the operation of the printer magnet as just described, it interrupts the circuit of the motor magnet 576 at its armature 530, thereby causing the motor magnet 576 to deenergize and advance the wipers 571—573 into engagement with their second bank contacts. Wiper 572 in moving from its first to its second bank contact removes the positive battery from conductor #1 of cable 561, and consequently from conductor #2 of cable 311, thereby causing the printer magnet #2 to deenergize and remove positive battery from conductor 644, thereby causing relay 529 to deenergize and again complete the circuit of motor magnet 576.

In this position of wiper 572, positive battery is extended over conductor #2 of cable 561 to wiper B2 of register switch 302, which is standing in engagement with its third bank contact, and over conductor #3 of cable 311 to printer magnet #3, thereby causing the operation of this printer magnet to print the numeral "3" and to again complete the circuit of relay 529, which, upon operating, causes the motor magnet 576 to advance the wipers of switch 570 into engagement with their third bank contacts, whereupon the circuit of the #3 magnet is opened. This magnet in turn opens the circuit of the motor magnet 576. Positive battery is now extended over wiper 572 to the #3 conductor of cable 561, and over this #3 conductor to wiper B3 of register switch 303. Since wiper B3 is standing in engagement with its eighth position contact, the positive battery is extended over conductor #8 of cable 311 to the #8 printer magnet, which magnet thereupon operates to cause the printing of the numeral "8" and the connection of positive battery to conductor 644, to again cause relay 529 to function to advance the wipers of switch 570 into engagement with the fourth contacts. In this position of the wipers, the positive battery is extended over wiper 572, conductor #4 of cable 561, to wiper B4 of register switch 304. Since wiper B4 is also standing in engagement with its eighth contact, the positive battery will again be extended over conductor #8 of cable 311 to the #8 printer magnet, whereupon the numeral "8" is printed by the electromatic printer and the relay 529 is operated to cause the advancement of wiper 572 to its fifth position.

In the fifth position of wiper 572, positive battery is extended over conductor #5 of cable 561 to wiper B5 of register switch 305, and thence over conductor #4 of cable 311, since wiper B4 is in engagement with its fourth contact, to the #4 printer magnet, whereupon the numeral "4" is printed by the electromatic printer and the relay 529 is once again operated to advance wiper 572 to its sixth position.

In the sixth position of wiper 572, positive battery is extended over the conductor connected to the sixth position contact and through the winding of relay 501 (Fig. 4), to negative battery, whereupon relay 501 operates and, at its armature 502, completes a locking circuit for itself to positive battery on conductor 584. At its four uppermost armatures, relay 501 connects the winding of relay 516 to conductors #1 to #5, inclusive, of cable 562, thereby placing positive battery through the winding of relay 516 on these five conductors for a purpose to be explained. At armature 503, relay 501 extends the positive battery through the winding of relay 516 to the motor magnet 576 by way of off-normal springs 578 of switch 570 and the interrupter contacts 577 of motor magnet 576. Therefore, motor magnet 576 functions in the well-known manner to restore the switch wipers to their normal position, in which position the off-normal springs 578 are opened and the circuit of the motor magnet 576, consequently, is opened. The off-normal springs 578 correspond to springs 64 and 65 shown in the above-mentioned Sengebusch patent.

Relay 501 at its armature 504 opens the locking circuit of relay 548, causing this relay to deenergize and retract its armature and thereby remove positive battery from conductors 582, 583, 590, 584, and 643. Relay 620 (Fig. 6) thereupon deenergizes and restores the circuits controlled thereby to the normal condition. Signal lamp L (Fig. 6) is extinguished by the removal of positive battery from conductor 582, thereby signifying to the operator that she may now operate the digit keys for the transmission of additional serial numbers and sales prices.

Relay 501, upon operating, at its armature 505 and make contact connects positive battery to conductor 581 (Figs. 5 and 6), and through the winding of carriage-return magnet 631 to negative battery. Carriage-return magnet 631 thereupon operates to cause the return of the printer carriage to its normal position.

Relay 548 is a slow-to-release relay and consequently delays the action described in connection with the deenergization thereof for an interval to allow the serial number registers to be restored to normal position before the signal lamp L is extinguished to remove the warning signal before being operated.

Inasmuch as the register switches 301 to 305, inclusive, are not in their zero or normal positions, the off-normal springs 361, 362, 363, 364, and 365 of those registers, respectively, are closed. Therefore, the connection of positive battery to conductors #1 to #5, inclusive, of cable 562 is extended over this cable to the motor magnets 341 to 345, inclusive, of register switches 301 to 305, inclusive, respectively. By means of their interrupter springs, these motor magnets operate to restore the wipers of the respective register switches to their normal position. As the wipers of each register switch reach their normal position, the off-normal springs of that register switch are opened and the motor magnet of that register switch, therefore, ceases to function; consequently the wipers remain in the normal or zero position.

Relay 516 operates over the conductors 1 to 5 inclusive, of cable 562 in series with the motor magnets, and being a slow-to-release relay, remains energized until the last of the off-normal springs of the register switches have been opened. Relay 516, at armature 517, connects positive battery to conductor 584 to maintain relay 501 locked and relay 555 energized, following the restoration of relay 548, until all of the register switches have been restored.

Upon the restoration of all of the register switches 301 to 305, inclusive, and the register-selecting switch 570 to their normal positions, relay 516 deenergizes and opens the locking circuit of relay 501 and the circuit of relay 555, whereupon these relays restore and in so doing return the equipment of Fig. 5 to the position in which it is shown in the drawings.

It will be appreciated that, following the operation of the serial-total key, the register-selecting switch 570 and the carriage of the printer-magnet are synchronously stepped until the printer-carriage has been moved to the proper position in which the serial-number total is listed in the proper column, that, during the positioning movement of the printer carriage, the necessary circuits are prepared by the action of the register-selecting switch 570 to cause the serial-number total registered in the serial number register to be printed digit by digit in the electromatic printer under the control of that printer, and that, when the complete serial total has been printed, the printer carriage is restored to normal as is also the serial number register and the register-selecting switch.

*Sales price total*

When it is desired to take a total of the sales prices and, at the same time, wipe out the total registered upon the sales price register of Fig. 4 in order that an entirely new total of other sales prices may be obtained, the operator depresses the price-total key (Fig. 6), whereupon positive battery is connected to conductor 641 (Figs. 5 and 6), and then, by way of armature 557 and resting contact of relay 555, through the winding of relay 541, to negative battery. Relay 541 then operates, and at its armature 545 and make contact, locks itself to positive battery by way of armature 509 and resting contact of relay 506. Relay 541, at its armature 543, connects positive battery to conductor 582 to commence the interrupter action of relays 531 and 529 to start the transmission of impulses over conductor 583 to motor magnet 576 of register-selecting switch 570 and, simultaneously therewith, over conductor 580 to the space magnet 630 of the electromatic printer. Relay 541, at its armature 542 and make contact, prepares a circuit for connecting positive battery to wiper 571, at its armature 546 and make contact, connects positive battery to conductor 584 to operate relay 555, and, at armature 547, prepares the energizing circuit of relay 524.

The motor magnet 576 responds to the impulses transmitted thereto over conductor 583 to rotate the wipers of the register-selecting switch 570 in a step-by-step manner over its bank contacts and the space magnet 630 (Fig. 6) responds to the impulses transmitted thereto over conductor 580 to step the printer carriage from its normal position in synchronism with the stepping of the wipers of the switch 570.

As wiper 573 passes over its fifth and sixth position contacts, relays 518 and 521 operate as previously described. This time, however, when wiper 573 reaches its normal position, no circuit is completed for relay 524 since relay 548 is not operated. Therefore, the wipers of switch 570 continue to step and wiper 573 eventually engages its fifth position contact the second time. When this occurs, positive battery on wiper 573 is extended over conductor 586, armature 522 and make contact of relay 521, conductor 588, armature 547 and make contact of relay 541, conductor 589, armature 528 and resting contact of relay 526, and through the winding of relay 524 to negative battery. Relay 524 thereupon operates and, at its armature 525, prepares the locking circuit for itself which includes the winding of relay 526. Relay 526 is unable to operate at this time since positive battery is connected to both terminals of its winding. Inasmuch as relay 526 is short circuited by the bridging action of wiper 573 until wiper 573 leaves its sixth position contact, relay 526 does not operate until the wipers of register-selecting switch 570 have been moved completely into seventh position. When this occurs, relay 526 operates, opening the energizing circuit of relay 531 and connecting conductor 583 to conductor 590, whereupon, upon the restoration of relay 529, the positive battery on conductor 582 is extended to wiper 571 and to the motor magnet 576.

When the transmission of impulses, by the action of relays 531 and 529, is stopped, upon the energization of relay 526, eighteen impulses will have been transmitted to the motor magnet 576 and to the space magnet 630, resulting in the positioning of the wipers of switch 570 in engagement with the seventh position contacts and the positioning of the printer carriage in its nineteenth position. This movement of the printer carriage to the nineteenth position for the printing of the first digit of the sales-price total establishes the fourth column on the record sheet in which only the sales-price totals are listed, as is evident in Fig. 7.

With wiper 571 in its seventh position, positive battery is connected to conductor #12 of cable 561 and extended thereover to wiper B12 of register switch 412 (Fig. 4). Wiper B12 of register switch 412 is standing in its normal or zero position at this time since not sufficient additions have taken place to cause the wipers of register 412 to be advanced from their normal to their first position to register a carry-over unit therein. Therefore, the positive battery on wiper B12 is extended over the #0 conductor of cable 311 to the #0 printing magnet of the electromatic printer, whereupon the digit "0" is printed in the nineteenth position of the carriage and the circuit of relay 529 is completed over conductor 644 from the make contacts of the #0 printer magnet. The wipers of the register-selecting switch 570 are thereupon advanced as is also the printer carriage.

In turn, now, positive battery is extended over conductors #11, #6, #7, #8, #9, and #10 of cable 561 and in turn through wipers B11, B6, B7, B8, B9, and B10 of register switches 411, 406, 407, 408, 409, and 410, respectively, and in turn over conductors #2, #0, #8, #8, #0, #0 of cable 311, and in turn to printer magnets #2, #0, #8, #8, #0, and #0, whereupon these magnets are operated in turn to print in the twentieth to the twenty-fifth positions, inclusive, the numerals 2, 0, 8, 8, 0, and 0, which indicate the sales-price total of $2,088.00, registered in the sales-price register.

As previously described, the register-selecting switch 570 is advanced under control of the printer magnets as each of these magnets operates to print the corresponding numeral of the sales-price total. After the last digit of the sales price has been printed, the printer carriage is advanced to the twenty-sixth position and the wipers of register selector 570 are advanced into engagement with the third bank contacts of their respective banks, whereupon the positive battery on wiper 571 is extended by way of conductor 585, armature 534 and resting contact of relay 533, to the winding of relay 506 and negative battery. Relay 506 thereupon operates, and, at its armature 507, locks itself to the positive battery on conductor 584 supplied through armature 546 and make contact of relay 541.

Relay 506, by means of its seven upper armatures extends positive battery through the winding of relay 516 over conductors #6 to #12, inclusive, of cable 562 to restore the register switches 406 to 412, inclusive, to normal. The connection of the positive battery to conductor #12 of cable 562 has no effect at this time since register 412 is in its normal position and the off-normal springs 462 are open. At armature 508 and make contact of relay 506, positive battery is extended through the winding of relay 516 to motor magnet 576 over off-normal springs 578 and interrupter contacts 577. Motor magnet 576 thereupon interrupts its own circuit until the wipers 571—573, inclusive, have been restored to their normal position, whereupon the off-normal springs 578 open and the wipers come to rest.

Relay 516 operates in series with the motor magnets of the registers and of the register-selecting switch 570 and remains so operated until the last of the registers has been restored to normal. During the time in which relay 516 is operated, it maintains positive battery on conductor 534 through its armature 517 to maintain relays 506 and 555 operated.

Relay 506 upon first operating opens the locking circuit of relay 541, which is restored, and places the deenergization of relay 555 under control of relay 516 by removing positive battery from conductor 584 at armature 546.

When relay 516 is finally restored, relay 506 is restored as is also relay 555, whereupon the total-taking keys are reconnected to the equipment of Fig. 5, and all the equipment of Fig. 5 is restored to its normal condition.

Following the printing of the last digit of the sales-price total, the carriage-return magnet 631 is operated over conductor 581 by the operation of relay 506 and the printer carriage is thereby restored to normal.

Sales price sub-total

The operation of the total-taking equipment, responsive to the operation of the price sub-total key, is identical with that just described in connection with the operation, when the price-total key is operated, up to the point where the wiper 571 is stepped from its second position contact to its third position contact following the operation of the electromatic printer to print the last digit of the sales-price total. Inasmuch as relay 533 is operated when the price sub-total is being taken, instead of the relay 541, the positive battery extended by way of wiper 571 and the third bank contact to conductor 585 is now extended by way of armature 534 and its make contacts to the winding of relay 511 rather than to the winding of relay 506 by way of resting contact of armature 534. Therefore, since relay 511 is provided with no contacts by means of which positive battery is connected to any of the conductors of cable 562, the sales-price register switches 406 to 412, inclusive, will not be restored to their normal or zero position following the printing of the sales-price total registered therein by the electromatic printer as is done in the case of the taking of the price-total by the operation of the price-total key.

Relay 511 performs certain functions similar to those performed by relay 506, namely, it opens the locking circuit of relay 533 at springs 514, causes the release of switch 570 by the closure of springs 513, and after this switch returns to normal and opens springs 578, the circuit of relays 511 and 516 is opened. Relay 516, upon deenergizing, in turn opens the circuit of relay 555 at springs 517, whereupon the equipment may be controlled in any manner desired by the operator.

Thus, it will be appreciated that totals can be taken whenever desired and the registers can be restored to normal or not as desired by the operator.

Although the present calculating machine has been shown and described as a key controlled device, it is to be understood that any suitable means can be employed in place of the digit keys without departing from the spirit and scope of the present invention. It is within the scope of this invention to employ a simple impulse transmitter in place of the digit keys, it is also within the scope of this invention to employ an impulse transmitter which transmits coded impulses and which could be substituted for the digit keys and associated coding relays, and it is within the scope of this invention, likewise, to employ in place of the digit keys, the coding relays, and the decoding relay groups, an impulse transmitter which would transmit the impulses directly to the computing relays 201 to 210, inclusive, at a sufficiently low rate of speed to permit the proper operation of the register switches.

The invention having been thus described, what is considered new and is desired to have protected by Letters Patent is described in the claims which follow.

What is claimed is:

1. In a calculating system, a series of digit register switches corresponding to the different orders of digits of a multi-digit number, each register switch having a plurality of positions one for each of the different numerical digits and each register switch always standing in one of those positions, whereby a series of digits is always registered in said series of register switches, means for transmitting a series of impulses corresponding to a series of digits constituting a multi-digit number, said impulses being transmitted in the sequence corresponding to the orders of digits of said number, means responsive to each impulse of said series and controlled by each of said register switches for operating said register switches to positions corresponding to the digits of the sum of the series of digits registered in the register switches and the series of digits represented by the series of impulses, and means whereby said register switches are rendered effective one at a time to control said impulse responsive means and in the digit-order sequence in which said impulses are transmitted.

2. In a calculating system, a series of digit lines and a series of result lines corresponding to the different digits, a digit register switch having a plurality of positions one for each of the different numerical digits and always standing in one of those positions, whereby the corresponding digit is registered therein; means for energizing the digit line corresponding to the position in which said register switch is standing, means for extending said digit lines to said result lines in accordance with the mathematical table for the addition of a predetermined digit, whereupon the result line corresponding to the digit representing the sum of the predetermined digit and the register digit is energized, and means functioning as the result of the energization of the result line for operating said register switch to the position corresponding to the digit represented by the energized result line.

3. In a calculating system, a series of digit lines and a series of result lines corresponding to the different digits, digit keys, means controlled by said keys for extending said digit lines to said result lines in accordance with the mathematical table of addition for that key, a digit register switch having a wiper, a magnet and control means for moving said wiper to any one of several positions corresponding to the different digits to register any digit therein, means responsive to the operation of any one of said digit keys for energizing the digit line corresponding to the position of said wiper, both of said means cooperating to energize the result line corresponding to the units digit of the result of the addition of the digit corresponding to the key operated and the digit registered in said switch, and means for operating said magnet and control means to move said wiper to the position corresponding to the digit represented by the energized result line.

4. In a calculating system, a series of digit lines and a series of result lines corresponding to the different digits, digit keys, means controlled by said digit keys for extending the digit lines to the result lines in accordance with the mathematical table of addition for that key, a pair of digit register switches, each switch having a wiper, each switch having a magnet and control means for moving its wiper to one of several positions, each position representing consecutive numbers in accordance with the different digits, to register a digit therein, means responsive to the operation of any one of said digit keys and controlled by the position of one of said switches for energizing the digit line corresponding to the number of the position of the wiper of one of said switches, whereupon the result line corresponding to the units digit of the result of the addition of the digit represented by the operated digit key and the digit registered in said one switch is energized, means for causing the magnet and control means of said one switch to move the wiper thereof to the position corresponding to the digit represented by the energized result line, and means effective whenever the result of the addition is ten or greater for causing the magnet of the other switch to advance the wiper thereof to the next-higher numbered position.

5. An adding machine comprising a series of digit lines and a series of result lines corresponding to the different digits, digit keys, a digit register switch having a pair of wipers and a self-interrupting motor magnet for rotating said wipers to any one of their several positions corresponding to the different digits, said wipers normally standing in one of said positions to register a digit in the switch, apparatus controlled by the operation of said digit keys for extending said digit lines to said result lines in accordance with the mathematical table of addition corresponding to the operated key, whereupon the result line corresponding to the result of the addition of the digit represented by the energized digit line and the digit represented by the operated digit key is energized, means controlled through one of said wipers by the operation of any one of said keys for energizing the digit line corresponding to the digit registered in the switch, means for closing the circuit of said magnet, whereupon said magnet automatically rotates said wipers, and means controlled through the other wiper of said switch for stopping said wipers in the position corresponding to the digit represented by the energized result line.

6. An adding machine comprising a series of digit register switches corresponding to the orders of digits of a multi-digit number, each switch having a wiper, a motor magnet for each switch for moving its wiper from one of its several positions in which it is normally standing to another of its positions, said positions corresponding to the different digits, digit keys representing the different digits, computing apparatus controlled jointly by said keys and each of said switches in turn for performing a series of additions, the first being the addition of the digit represented by the first key operated and the digit corresponding to the position of the wiper of the first switch of the series, the last being the addition of the digit represented by the last-operated digit key and the digit represented by the position of the wiper of the last switch of the series, means for causing the motor magnet of each switch, while it is the controlling switch, to move the wiper of that switch to the position corresponding to the digit resulting from the addition in connection therewith, means for stopping said switch when it arrives at the proper position, whereby the resultant total is registered in said series of switches.

7. In a computing system wherein multi-digit numbers are added together, a series of register switches, one register switch for each order of digits of a multi-digit number, each switch having a wiper normally standing in one of its several positions which correspond to the different digits to thereby register the corresponding digit, a motor magnet for each switch for moving the wiper to another position, digit keys corresponding to the different digits, computing apparatus controlled jointly by said keys and said switch to add the digits represented by the operated ones of said keys to the digits registered in said switches, and means for rendering said switches effective to control said computing apparatus one at a time and in the descending orders of digits, whereby a series of additions of corresponding orders of digits is performed, and means for causing the motor magnet of each switch to move the wiper thereof to the position representing the digit corresponding to the result of the addition performed in connection therewith and means for stopping said switch when it arrives at said position.

8. In a computing system wherein multi-digit numbers are added together, a series of register switches corresponding to the orders of digits of multi-digit numbers, each switch having a wiper normally standing in one of its several positions corresponding to the different digits, whereby the digits of one multi-digit number are represented by the positions of the wipers of the series of switches, a motor magnet for each switch for advancing the wiper from one position to another, digit keys corresponding to the different digits and adapted to be operated in accordance with—and in the descending orders of—the digits of the multi-digit number to be added to the number registered in said switches, computing apparatus controlled jointly by said switches and the operated ones of said keys to add together the number registered in the switches and the number represented by the operated keys, a sequence switch controlled by said register switches for rendering said switches effective to control said computing apparatus one at a time in the descending orders of digits, whereby only corresponding orders of digits of the two numbers are added together one at a time, means for causing the motor magnet of each register switch to advance the wiper thereof to the position corresponding to the digit representing the result of the addition performed in connection therewith, and means for stopping the wiper when it reaches that position.

9. In a computing system wherein multi-digit numbers are added together, a series of register switches corresponding to the orders of digits of multi-digit numbers, each switch having a wiper normally standing in one of its several positions corresponding to the different digits, whereby the digits of one multi-digit number are represented by the positions of the wipers of the series of switches, a motor magnet for each switch for advancing the wiper from one position to another, digit keys corresponding to the different digits and adapted to be operated in accordance with—and in the descending orders of— the digits of the multi-digit number to be added to the number registered in said switches, computing apparatus controlled jointly by said switches and the operated ones of said keys to add together the number registered in the switches and the number represented by the operated keys, a sequence switch controlled by said register switches for rendering said switches effective to control said computing apparatus one at a time in the descending orders of digits, whereby only corresponding orders of digits of the two numbers are added together one at a time, means for causing the motor magnet of each switch to advance the wiper thereof to the position corresponding to the digit representing the units digit of the result of the addition performed in connection therewith, means for stopping the operation of the motor magnet when the wiper reaches that position, and means for causing the motor magnet of the switch corresponding to the next-higher order of digits to advance the wiper thereof to the next-higher digit position whenever the result of the addition in connection with one register switch is equal to ten or more, whereby the tens digit of the addition is registered.

10. Calculating apparatus comprising a digit register switch having a pair of wipers normally standing in one of their several positions which correspond to the different digits whereby the digit corresponding to said position is registered in the switch, and having a motor magnet for advancing said wipers from one position to another, said magnet provided with interrupter springs whereby said magnet operates automatically when its circuit is closed to advance the wipers in a step-by-step manner to one position after another, digit keys corresponding to the different digits, computing apparatus controlled jointly by an operated one of said keys and said switch for performing an addition of the digit registered in said switch and the digit represented by said operated key by marking the position for the other wiper corresponding to the digit representing the result of said addition, means for closing the circuit of said magnet to automatically advance said wiper, and means operating automatically responsive to said other wiper reaching its marked position for opening the circuit of said magnet to arrest said one wiper in its position corresponding to said resultant digit.

11. In a calculating system, a register switch having banks of contacts and a pair of wipers normally standing in engagement with one of the several contacts of their respective banks, the contacts of each bank corresponding to the different digits, and having a motor magnet provided with interrupter contacts whereby said magnet automatically advances said wipers when its circuit is closed, a series of digit lines corresponding to the different digits, and a series of result lines connected to the bank contacts of one of said wipers, digit keys corresponding to the different digits, means responsive to the operation of any one of said keys for energizing the digit line corresponding to the position of the other wiper of said switch and for closing the circuit of said magnet to cause it to advance said wipers, means for extending said digit lines to said result lines in accordance with the mathematical table of addition corresponding to the operated key, whereby the result line, and, consequently, the bank contact of said one wiper corresponding to the digit representing the result of the addition of the digit corresponding to the energized digit line and the digit corresponding to the operated digit key is energized, and means responsive to said one wiper engaging said energized contact for opening the circuit of said magnet to arrest said other wiper on a contact corresponding to said resultant digit, whereby the result of the addition is registered in said switch.

12. Calculating apparatus for adding together two multi-digit numbers, comprising a multi-digit register, the register constituting a plurality of register switches each having a wiper normally standing in one of its several positions corresponding to the different digits registered therein, each register switch having a motor magnet provided with interrupter contacts for automatically advancing its wipers to one position after another when the circuit of said magnet is closed, digit keys representing the different numerical digits and operated in accordance with the descending orders of digits of the number to be added to the number registered in said register, computing apparatus controlled jointly by the operated ones of said keys and those register switches corresponding to the orders of digits of the operated keys for adding the multi-digit number represented by the operated keys to the multi-digit number registered in said register switches, means for rendering said operated keys effective to control said computing apparatus for one digit at a time and in the descending orders of digits and for rendering said corresponding register switches effective one at a time to control said computing apparatus in the descending orders of digits to perform a series of additions of corresponding orders of digits of the two numbers, means for closing the circuit of the motor magnet of each of the register switches as said apparatus is being controlled by the register switch to advance the wiper of the controlling register switch, means for opening each motor magnet circuit to arrest each wiper in the position corresponding to the digit representing the result of the addition being performed at that time, and means controlled by said computing apparatus each time an addition of corresponding orders of digits is performed for closing the circuit of the motor magnet of the register switch of the next-higher order of digits whenever the result of the addition being performed is ten or greater to cause the advancement of the wiper of said next-higher register switch to the digit position next higher to the one in which the wiper is standing, whereby the tens digit resulting from an addition is registered.

13. In a calculating system, a series of digit register switches corresponding to the different orders of digits of a multi-digit number, each switch having sets of bank contacts and a pair of wipers always standing in engagement with a contact of their respective banks, the contacts of each bank corresponding to the different digits, a series of digit lines corresponding to the different digits, a series of result lines also corresponding to the different digits, each result line being multiply connected to the corresponding bank contacts of one of said pairs of wipers in each switch, means for transmitting a series of impulses corresponding to a series of digits constituting a multi-digit number in the sequence of the order of digits, means responsive to the transmission of each digit of the series in turn and controlled by each switch of the series in turn for energizing in turn the digit lines corresponding to the positions of the other wiper of each of said pairs and means responsive to the transmission of each digit for extending the digit lines to the result lines a number of times corresponding to the number of digits transmitted, whereupon one result line is energized each time said digit lines are extended thereto, means for rendering said switches effective one at a time to control said last means and in the digit-order sequence in which said impulses are transmitted, means effective upon each switch becoming the controlling switch for automatically advancing the pair of wipers of that switch, and means responsive to the said one wiper of each switch encountering the bank contact, to which the energized result line is connected, for stopping the said other wiper of that switch on the contact corresponding to the digit represented by the energized result line.

14. In a calculating system wherein two multi-digit numbers are added together, one of which may be the result of one or more previous additions, digit keys corresponding to the different digits, means controlled by said keys and responsive to the operation thereof in accordance with the digits of a multi-digit number for transmitting a series of current impulses corresponding to the digits represented by the operated keys, said keys being operated in a sequence corresponding to the descending values of the orders of digits, means for storing said impulses, a series of register switches corresponding to the orders of digits of the resultant number, each switch having a wiper normally standing in one of its positions corresponding to the different digits, whereby each switch always has a digit registered therein, computing apparatus, means including said impulse storing means and said register switches whereby said computing apparatus is controlled a number of times corresponding to the number of stored impulses to perform a series of additions in a sequence corresponding to the descending values of the orders of digits, each addition being the adding of the digit represented by one of the stored impulses to the digit represented by the position of the wiper of the switch of the corresponding order of digits, means for operating each switch to advance its wiper and means for stopping the switch when its wiper reaches the position corresponding to the digit resulting from the addition performed in connection therewith.

15. In a calculating system, the combination of a series of digit register switches corresponding to the orders of digits of a multi-digit number, each register switch comprising a switch having a wiper normally standing in one of its several positions which correspond to the different digits, whereby the digit corresponding to said one position is registered therein, digit keys corresponding to the different digits, computing apparatus, means controlled by the operations of said digit keys and the position of said register switches in accordance with the digits of a multi-digit number for controlling said computing apparatus to add the digits represented by the operated keys to the digits registered in said register switches, means for operating said switches to advance said wipers and means for stopping said switches when the wipers reach the positions corresponding to the digits of the result of said addition, each switch registering a different order of digits of the result.

16. In a calculating system, the combination of a series of digit register switches corresponding to the orders of digits of a multi-digit number, each register switch comprising a switch having a wiper normally standing in one of its several positions corresponding to the different digits, the register switches being adapted to be operated one at a time in accordance with the digits of a multi-digit number, computing apparatus controlled jointly by said keys and said register switches to add the number represented by the operated digit keys to the number represented by the positions of said wipers, means for advancing said wipers to positions corresponding to the digits of the resultant number, and means for stopping the advance of each wiper when it has been advanced to the position corresponding to the digit of the resultant number corresponding in order to the order represented by the switch.

17. In a calculating system, the combination of a series of register switches corresponding to the orders of digits of a multi-digit number, each switch having a set of bank contacts and a wiper normally standing on one of its bank contacts which corresponds to the different digits whereby a series of digits is always registered in the series of switches, means for transmitting a series of impulses corresponding to the digits of a multi-digit number, means for storing said impulses, computing apparatus controlled by said storing means and by the position of the wipers of said register switches to add the digits representing the sum of the digits registered in said switches to the digits corresponding to the stored impulses, means for moving said wipers, and means for stopping the movement of the wipers when moved on to the contacts corresponding to the resultant number.

HAROLD C. ROBINSON.